US012672151B2

(12) United States Patent
Dinan

(10) Patent No.: US 12,672,151 B2
(45) Date of Patent: \*Jun. 30, 2026

(54) CELL ACTIVATION AND DEACTIVATION IN A WIRELESS NETWORK

(71) Applicant: Ofinno, LLC, Reston, VA (US)

(72) Inventor: Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/767,545

(22) Filed: Jul. 9, 2024

(65) Prior Publication Data

US 2025/0039886 A1     Jan. 30, 2025

Related U.S. Application Data

(63) Continuation of application No. 17/973,254, filed on Oct. 25, 2022, now Pat. No. 12,075,443, and a continuation of application No. 17/973,222, filed on Oct. 25, 2022, now Pat. No. 12,069,692, said application No. 17/973,254 is a continuation of
(Continued)

(51) Int. Cl.
| H04W 72/23 | (2023.01) |
| H04L 5/00 | (2006.01) |
| H04W 72/0453 | (2023.01) |

(52) U.S. Cl.
CPC .............. *H04W 72/23* (2023.01); *H04L 5/00* (2013.01); *H04L 5/001* (2013.01); *H04L 5/0048* (2013.01); *H04L 5/0053* (2013.01); *H04L 5/0091* (2013.01); *H04W 72/0453* (2013.01)

(58) Field of Classification Search
CPC ......... H04L 5/00; H04L 5/001; H04L 5/0048; H04L 5/0053; H04L 5/0091; H04W 72/042; H04W 72/0453
See application file for complete search history.

(56) References Cited

U.S. PATENT DOCUMENTS

| 9,107,190 B2 | 8/2015 | Dalsgaard et al. |
| 9,319,194 B2 | 4/2016 | Dinan |
| (Continued) | | |

FOREIGN PATENT DOCUMENTS

| EP | 3 079 436 B1 | 9/2018 |
| WO | 2013/179590 A1 | 12/2013 |
| (Continued) | | |

OTHER PUBLICATIONS

3GPP TSG RAN WG1 meeting #82bis, R1-155385, Malmo, Sweden, Oct. 5-9, 2015, Title: Energy detection threshold in LAA.
(Continued)

*Primary Examiner* — Benjamin H Elliott, IV
(74) *Attorney, Agent, or Firm* — Patrick Moon; Kavon Nasabzadeh; Jacob L. Mangan

(57) ABSTRACT

A wireless device may be instructed to activate a cell. The wireless device may activate a cell and start a timer. The wireless device may receive downlink control information (DCI). The DCI may indicate monitoring of a downlink control channel or may indicate a resource grant. The wireless device may monitor the downlink control channel and start another timer. The wireless device may receive the resource grant while one or more timers are running.

26 Claims, 9 Drawing Sheets

Related U.S. Application Data application No. 16/922,847, filed on Jul. 7, 2020, now Pat. No. 11,516,792, said application No. 17/973,222 is a continuation of application No. 16/922,757, filed on Jul. 7, 2020, now Pat. No. 11,523,379, said application No. 16/922,847 is a continuation of application No. 16/184,742, filed on Nov. 8, 2018, now Pat. No. 10,708,901, said application No. 16/922,757 is a continuation of application No. 16/184,742, filed on Nov. 8, 2018, now Pat. No. 10,708,901, which is a continuation of application No. 15/273,341, filed on Sep. 22, 2016, now Pat. No. 10,172,124.

(60) Provisional application No. 62/221,701, filed on Sep. 22, 2015.

(56) References Cited

U.S. PATENT DOCUMENTS

| | | | |
|---|---|---|---|
| 9,736,795 B2 | 8/2017 | Dinan | |
| 9,781,712 B2 | 10/2017 | Nory et al. | |
| 9,872,336 B2 | 1/2018 | Dinan | |
| 9,894,681 B2 | 2/2018 | Dinan | |
| 9,900,836 B2 | 2/2018 | Axén et al. | |
| 10,172,124 B2* | 1/2019 | Dinan | H04L 5/001 |
| 10,200,164 B2* | 2/2019 | Dinan | H04L 1/0026 |
| 10,200,992 B2* | 2/2019 | Dinan | H04W 16/14 |
| 10,678,223 B2* | 6/2020 | Entzminger | G05B 19/41835 |
| 10,708,901 B2* | 7/2020 | Dinan | H04L 5/0091 |
| 10,873,921 B2 | 12/2020 | Dinan | |
| 11,209,801 B2* | 12/2021 | Entzminger | G05B 19/4183 |
| 11,297,678 B2 | 4/2022 | Loehr et al. | |
| 11,516,792 B2* | 11/2022 | Dinan | H04W 72/0453 |
| 11,523,379 B2* | 12/2022 | Dinan | H04L 5/00 |
| 12,069,692 B2* | 8/2024 | Dinan | H04W 72/23 |
| 2011/0134774 A1* | 6/2011 | Pelletier | H04W 76/15 |
| | | | 370/242 |
| 2011/0243016 A1* | 10/2011 | Zhang | H04W 72/04 |
| | | | 370/252 |
| 2011/0268029 A1* | 11/2011 | Tseng | H04L 5/001 |
| | | | 370/328 |
| 2012/0069802 A1* | 3/2012 | Chen | H04L 5/001 |
| | | | 370/329 |
| 2012/0082088 A1* | 4/2012 | Dalsgaard | H04W 74/0875 |
| | | | 370/315 |
| 2012/0182879 A1* | 7/2012 | Tamura | H04L 5/0057 |
| | | | 370/242 |
| 2012/0213163 A1* | 8/2012 | Lee | H04W 72/20 |
| | | | 370/329 |
| 2012/0250520 A1* | 10/2012 | Chen | H04W 56/0045 |
| | | | 370/328 |
| 2012/0257570 A1* | 10/2012 | Jang | H04W 72/23 |
| | | | 370/328 |
| 2012/0329461 A1* | 12/2012 | Teyeb | H04W 36/00835 |
| | | | 455/437 |
| 2013/0010619 A1* | 1/2013 | Fong | H04W 74/0833 |
| | | | 370/252 |
| 2013/0028198 A1* | 1/2013 | Yamada | H04W 48/20 |
| | | | 370/328 |
| 2013/0083675 A1* | 4/2013 | Yamada | H04W 24/08 |
| | | | 370/252 |
| 2013/0094392 A1* | 4/2013 | Kim | H04L 1/0026 |
| | | | 370/252 |
| 2013/0114398 A1* | 5/2013 | Wang | H04W 76/28 |
| | | | 370/336 |
| 2013/0188472 A1* | 7/2013 | Fang | H04L 45/44 |
| | | | 370/216 |
| 2013/0188473 A1* | 7/2013 | Dinan | H04W 74/0833 |
| | | | 370/216 |
| 2013/0188612 A1* | 7/2013 | Dinan | H04W 56/0045 |
| | | | 370/336 |
| 2013/0195057 A1 | 8/2013 | Dinan | |
| 2013/0208587 A1 | 8/2013 | Bala et al. | |
| 2013/0215848 A1 | 8/2013 | Kato et al. | |
| 2013/0235768 A1 | 9/2013 | Earnshaw et al. | |
| 2013/0272233 A1 | 10/2013 | Dinan | |
| 2013/0279433 A1 | 10/2013 | Dinan | |
| 2013/0301446 A1 | 11/2013 | Chen et al. | |
| 2014/0016506 A1* | 1/2014 | Gauvreau | H04L 5/0098 |
| | | | 370/254 |
| 2014/0016593 A1 | 1/2014 | Park et al. | |
| 2014/0036664 A1 | 2/2014 | Han et al. | |
| 2014/0050113 A1 | 2/2014 | Rosa et al. | |
| 2014/0056220 A1 | 2/2014 | Poitau et al. | |
| 2014/0161117 A1 | 6/2014 | Sebire et al. | |
| 2014/0269595 A1 | 9/2014 | Lee et al. | |
| 2014/0337504 A1 | 11/2014 | Lorch et al. | |
| 2015/0003418 A1 | 1/2015 | Rosa et al. | |
| 2015/0016350 A1 | 1/2015 | Moulsley et al. | |
| 2015/0036614 A1* | 2/2015 | Lee | H04W 56/0045 |
| | | | 370/329 |
| 2015/0049739 A1* | 2/2015 | Lee | H04W 72/23 |
| | | | 370/336 |
| 2015/0078286 A1 | 3/2015 | Kim et al. | |
| 2015/0085808 A1* | 3/2015 | Xu | H04W 72/23 |
| | | | 370/329 |
| 2015/0087315 A1 | 3/2015 | Lu et al. | |
| 2015/0087316 A1 | 3/2015 | Bostrom et al. | |
| 2015/0117342 A1 | 4/2015 | Loehr et al. | |
| 2015/0124670 A1 | 5/2015 | Park | |
| 2015/0146588 A1 | 5/2015 | Park | |
| 2015/0181453 A1 | 6/2015 | Chen et al. | |
| 2015/0181590 A1 | 6/2015 | Park | |
| 2015/0189574 A1* | 7/2015 | Ng | H04W 52/245 |
| | | | 370/254 |
| 2015/0215079 A1 | 7/2015 | Park | |
| 2015/0215977 A1 | 7/2015 | Yamazaki | |
| 2015/0223213 A1 | 8/2015 | Moon et al. | |
| 2015/0245219 A1 | 8/2015 | Wei | |
| 2015/0245307 A1 | 8/2015 | Chen et al. | |
| 2015/0256303 A1 | 9/2015 | Belghoul et al. | |
| 2015/0271811 A1 | 9/2015 | Kim et al. | |
| 2015/0289179 A1 | 10/2015 | Liu et al. | |
| 2015/0312930 A1 | 10/2015 | Han et al. | |
| 2015/0334603 A1* | 11/2015 | Uchino | H04L 5/0057 |
| | | | 370/331 |
| 2016/0044617 A1 | 2/2016 | Vajapeyam et al. | |
| 2016/0044655 A1 | 2/2016 | Park et al. | |
| 2016/0044737 A1 | 2/2016 | Kwon | |
| 2016/0066284 A1 | 3/2016 | Kwon et al. | |
| 2016/0080126 A1 | 3/2016 | Dinan | |
| 2016/0095114 A1 | 3/2016 | Kim et al. | |
| 2016/0135148 A1 | 5/2016 | Novlan et al. | |
| 2016/0143014 A1 | 5/2016 | Mukherjee et al. | |
| 2016/0150485 A1 | 5/2016 | Yi et al. | |
| 2016/0174247 A1 | 6/2016 | Ruiz Delgado et al. | |
| 2016/0192388 A1 | 6/2016 | Ekpenyong et al. | |
| 2016/0204905 A1 | 7/2016 | Lee et al. | |
| 2016/0205681 A1 | 7/2016 | Kim et al. | |
| 2016/0227417 A1 | 8/2016 | Yerramalli et al. | |
| 2016/0227428 A1 | 8/2016 | Novlan et al. | |
| 2016/0227541 A1 | 8/2016 | Damnjanovic et al. | |
| 2016/0242153 A1 | 8/2016 | Chen et al. | |
| 2016/0262118 A1 | 9/2016 | Kim et al. | |
| 2016/0277987 A1 | 9/2016 | Chen et al. | |
| 2016/0278050 A1 | 9/2016 | Nory et al. | |
| 2016/0285716 A1 | 9/2016 | Pelletier et al. | |
| 2016/0302177 A1 | 10/2016 | Kwon et al. | |
| 2016/0302228 A1 | 10/2016 | Kazmi et al. | |
| 2016/0337112 A1* | 11/2016 | Suzuki | H04L 5/0053 |
| 2016/0345206 A1 | 11/2016 | Yerramalli et al. | |
| 2016/0365959 A1 | 12/2016 | Dinan | |
| 2016/0366675 A1 | 12/2016 | Dinan | |
| 2016/0366681 A1 | 12/2016 | Dinan | |
| 2016/0374082 A1* | 12/2016 | Nguyen | H04W 72/12 |
| 2016/0381681 A1 | 12/2016 | Nogami et al. | |
| 2017/0013469 A1 | 1/2017 | Larsson et al. | |
| 2017/0041059 A1 | 2/2017 | Yi et al. | |
| 2017/0041805 A1 | 2/2017 | Chandrasekhar et al. | |
| 2017/0041905 A1 | 2/2017 | Chen et al. | |
| 2017/0048718 A1 | 2/2017 | Kim et al. | |
| 2017/0048880 A1 | 2/2017 | Anderson et al. | |

(56) References Cited

U.S. PATENT DOCUMENTS

| | | | |
|---|---|---|---|
| 2017/0054568 A1* | 2/2017 | Lee | H04W 76/38 |
| 2017/0055242 A1* | 2/2017 | Kusashima | H04L 5/0051 |
| 2017/0055263 A1 | 2/2017 | Tomeba et al. | |
| 2017/0055293 A1 | 2/2017 | Yang et al. | |
| 2017/0078995 A1* | 3/2017 | Dinan | H04W 16/14 |
| 2017/0086172 A1* | 3/2017 | Dinan | H04L 5/0091 |
| 2017/0086194 A1 | 3/2017 | Tavildar et al. | |
| 2017/0094681 A1 | 3/2017 | Takeda et al. | |
| 2017/0099633 A1 | 4/2017 | Axén et al. | |
| 2017/0111888 A1* | 4/2017 | Dinan | H04W 72/044 |
| 2017/0117997 A1 | 4/2017 | Park et al. | |
| 2017/0118658 A1 | 4/2017 | Hwang et al. | |
| 2017/0127414 A1 | 5/2017 | Yi et al. | |
| 2017/0135023 A1 | 5/2017 | Jung et al. | |
| 2017/0135127 A1 | 5/2017 | Nogami et al. | |
| 2017/0150548 A1* | 5/2017 | Shah | H04L 5/0098 |
| 2017/0164361 A1 | 6/2017 | Park | |
| 2017/0181143 A1 | 6/2017 | Kim et al. | |
| 2017/0195099 A1 | 7/2017 | Kahtava et al. | |
| 2017/0195935 A1 | 7/2017 | Xu et al. | |
| 2017/0196020 A1 | 7/2017 | Mukherjee et al. | |
| 2017/0201308 A1 | 7/2017 | Park et al. | |
| 2017/0201985 A1 | 7/2017 | Wang | |
| 2017/0202022 A1 | 7/2017 | Chendamarai Kannan et al. | |
| 2017/0223677 A1 | 8/2017 | Dinan et al. | |
| 2017/0251454 A1 | 8/2017 | Yang et al. | |
| 2017/0265225 A1 | 9/2017 | Takeda et al. | |
| 2017/0280430 A1 | 9/2017 | Yin et al. | |
| 2017/0311206 A1 | 10/2017 | Ryoo et al. | |
| 2017/0311322 A1 | 10/2017 | Kim et al. | |
| 2017/0325258 A1 | 11/2017 | Nogami et al. | |
| 2017/0339580 A1 | 11/2017 | Martin et al. | |
| 2017/0339607 A1 | 11/2017 | Lu et al. | |
| 2017/0339717 A1 | 11/2017 | Futaki | |
| 2017/0339721 A1 | 11/2017 | Mukherjee et al. | |
| 2017/0353912 A1 | 12/2017 | Einhaus et al. | |
| 2017/0353965 A1 | 12/2017 | Zhang | |
| 2017/0373914 A1 | 12/2017 | Harada et al. | |
| 2018/0007708 A1 | 1/2018 | Ke et al. | |
| 2018/0014291 A1 | 1/2018 | Takeda et al. | |
| 2018/0041989 A1 | 2/2018 | Shimezawa et al. | |
| 2018/0048498 A1 | 2/2018 | Stern-Berkowitz et al. | |
| 2018/0049221 A1 | 2/2018 | Park et al. | |
| 2018/0049241 A1 | 2/2018 | Heo et al. | |
| 2018/0049271 A1* | 2/2018 | Bagheri | H04W 72/21 |
| 2018/0077581 A1 | 3/2018 | Ahn et al. | |
| 2018/0077688 A1 | 3/2018 | Yi et al. | |
| 2018/0092073 A1 | 3/2018 | Nogami et al. | |
| 2018/0092118 A1 | 3/2018 | Kim et al. | |
| 2018/0098334 A1* | 4/2018 | Tie | H04W 72/12 |
| 2018/0110045 A1 | 4/2018 | You et al. | |
| 2018/0115981 A1 | 4/2018 | Kim et al. | |
| 2018/0139701 A1 | 5/2018 | Wang et al. | |
| 2018/0139767 A1 | 5/2018 | Lee et al. | |
| 2018/0220303 A1 | 8/2018 | Futaki | |
| 2018/0242264 A1 | 8/2018 | Pelletier et al. | |
| 2018/0242357 A1 | 8/2018 | Khirallah et al. | |
| 2018/0288826 A1 | 10/2018 | Chiba | |
| 2018/0295609 A1 | 10/2018 | Shimezawa et al. | |
| 2019/0029047 A1 | 1/2019 | Zhu et al. | |
| 2019/0079502 A1* | 3/2019 | Entzminger | G05B 19/41835 |
| 2019/0082355 A1 | 3/2019 | Ryoo et al. | |
| 2019/0239252 A1* | 8/2019 | Babaei | H04W 72/23 |
| 2019/0281585 A1* | 9/2019 | Dinan | H04L 5/00 |
| 2019/0289635 A1* | 9/2019 | Wang | H04L 27/0006 |
| 2020/0337036 A1* | 10/2020 | Dinan | H04L 5/0053 |
| 2020/0337037 A1* | 10/2020 | Dinan | H04W 72/23 |
| 2021/0011464 A1* | 1/2021 | Entzminger | G05B 19/41835 |
| 2023/0040898 A1* | 2/2023 | Dinan | H04L 5/00 |
| 2023/0054456 A1* | 2/2023 | Dinan | H04L 5/0091 |
| 2024/0023037 A1 | 1/2024 | Liu et al. | |
| 2025/0039886 A1* | 1/2025 | Dinan | H04L 5/00 |

FOREIGN PATENT DOCUMENTS

| | | | |
|---|---|---|---|
| WO | 2015/167266 A1 | 11/2015 | |
| WO | 2016/021821 A1 | 2/2016 | |
| WO | 2016/149167 A1 | 9/2016 | |
| WO | 2016157797 A1 | 10/2016 | |
| WO | 2017030487 A1 | 2/2017 | |

OTHER PUBLICATIONS

3GPP TSG RAN WG1 Meeting #82bis, R1-155626, Malmö, Sweden, Oct. 5-9, 2015, Agenda item: 7.2.3.1, Source: Alcatel-Lucent Shanghai Bell, Alcatel-Lucent, Title: Multi-carrier LBT operation for LAA.

3GPP TSG RAN WG1 Meeting #82bis, R1-155816, Malmö, Sweden, Oct. 5-9, 2015, Agenda Item: 7.2.3.1, Source: Lenovo, Title: Multi-carrier LBT operation for LAA.

3GPP TSG RAN WG1 Meeting #82bis, R1-155898, Malmö, Sweden, Oct. 5-9, 2015, Source: Ntt Docomo, Inc., Title: Views on LBT for multiple carriers.

3GPP TSG RAN WG1 Meeting #82bis, R1-156033, Malmö, Sweden, Oct. 5-9, 2015, Source: Ericsson, Title: On Channel Access Solutions for LAA Multi-Carrier Transmission.

3GPP TSG RAN WG1 Meeting #82bis, R1-156037, Malmö, Sweden, Oct. 5-9, 2015, Source: Ericsson, Title: On Adaptation of the Energy Detection Threshold for LAA.

3GPP TSG RAN WG1 Meeting #83 R1-156510, Anaheim, USA, Nov. 15-22, 2015, Agenda item: 6.2.3.1, Source: Intel Corporation, Title: Remaining Details on LBT.

3GPP TSG RAN WG1 Meeting #83 R1-156574, Anaheim, USA, Nov. 15-22, 2015, Source: CATT, Title: Remaining details of DL LBT for LAA.

3GPP TSG RAN WG1 Meeting #83 R1-156576, Anaheim, USA, Nov. 15-22, 2015, Source: CATT, Title: DL LBT for LAA multi-carrier transmission.

3GPP TSG RAN WG1 Meeting #83 R1-156762, Anaheim, USA, Nov. 15-22, 2015, Agenda Item: 6.2.3.1, Source: Samsung, Title: ED threshold adaptation for LAA.

3GPP TSG RAN WG1 Meeting #83 R1-156768, Anaheim, USA, Nov. 15-22, 2015, Agenda item: 6.2.3.1, Source: Samsung, Title: Discussion on LBT for UL transmission.

3GPP TSG RAN WG1 meeting #83 R1-156857, Anaheim, USA, Nov. 15-22, 2015, Agenda Item: 6.2.3.1, Source: LG Electronics, Title: Multi-carrier DL TX in LAA.

3GPP TSG RAN WG1 Meeting #83 R1-157014, Anaheim, USA, Nov. 15-22, 2015, Title: Multi-carrier LBT operation for LAA, Source: Alcatel-Lucent Shanghai Bell, Alcatel-Lucent.

3GPP TSG RAN WG1 Meeting #83 R1-157172, Anaheim, USA, Nov. 15-22, 2015, Agenda Item: 6.2.3.1, Source: Intel Corporation, Title: On the LAA ED threshold.

3GPP TSG RAN WG1 Meeting #83 R1-157255, Anaheim, USA, Nov. 16-20, 2015, Source: Ericsson, Title: On Energy Detection Threshold for LAA.

3GPP TSG RAN WG1 Meeting #83 R1-157258, Anaheim, USA, Nov. 16-20, 2015, Source: Ericsson, Title: On Channel Access Solutions for LAA Multi-Carrier Transmission.

3GPP TSG RAN WG1 Meeting #83 R1-157281, Anaheim, USA, Nov. 15-22, 2015, Agenda item: 6.2.3.1, Source: HTC, Title: Discussion on Adaptation Rules of the Maximum Energy Detection Threshold in LAA Coexistence.

3GPP TSG RAN WG1 Meeting #83 R1-157330, Anaheim, USA, Nov. 15-22, 2015, Source: WILUS Inc., Title: Consideration on Multicarrier LBT for LAA.

3GPP TSG RAN WG1 Meeting 83 R1-156702, Anaheim, USA, Nov. 16-20, 2015, Source: SONY, Title: LAA energy detection adaptation rules.

3GPP TSG RAN WG1, Meeting #82bis, R1-155386, Malmö, Sweden, Oct. 5-9, 2015, Title: UL LBT design in LAA.

3GPP TSG RAN WG1 Meeting #82bis, R1-155914, Malmö, Sweden, Oct. 5-9, 2015, Agenda item: 7.2.3.1, Source: Institute for Information Industry (III) Title: Considerations on Energy Detection Threshold Adaptation.

(56) References Cited

OTHER PUBLICATIONS

3GPP TSG RAN WG1 Meeting #83 R1-157009, Anaheim, USA, Nov. 15-22, 2015, Agenda item: 6.2.3.1, Source: Broadcom Corporation, Title: Further Discussion on LAA DL Multi-channel LBT.

3GPP TSG RAN WG1 Meeting #83 R1-157306, Anaheim, USA, Nov. 15-22, 2015, Agenda item: 6.2.3.1, Source: Nokia Networks, Title: Multi-carrier LBT for DL LAA.

R1-143396, 3GPP TSG RAN WG1 Meeting #78, Dresden, Germany, Aug. 18-22, 2014, Source: Ericsson, Title: Summary of email discussion [77-08]:Small cell on/off transition lime reduction.

R1-154593, 3GPP TSG RAN WG1#82, Aug. 24-28, 2015, Beijing, China, Source: Motorola Mobility, Title: Activation/ Deactivation procedures for LAA SCells.

R1-154974, 3GPP TSG RAN WG1 Meeting #82, Beijing, China, Aug. 24-28, 2015, Title: WF on LAA cell selection and synchronization.

R2-152226, 3GPP TSG-RAN WG2#90, Fukuoka, Japan, May 25-29, 2015, Source: Samsung Title: LAA SCell Activation and Deactivation.

R2-152362, revision of R2-151652, 3GPP TSG-RaN WG2 Meeting #90, Fukuoka, Japan, May 25-29, 2015, Source: LG Electronics Inc., Title: Consideration on DL MAC for unlicensed band.

R2-153163, revision of R2-152362, 3GPP TSG-RAN WG2 Meeting #91 Beijing, China, Aug. 24-28, 2015, Source: LG Electronics Inc., Title: Consideration on DL MAC for unlicensed band.

R2-153431, 3GPP TSG RAN WG2 #91, Beijing, China, Aug. 24-28, 2015, Source: ETRI, Title: Discussion on Activation/ Deactivation for LAA.

3GPP TSG RAN WG1 Meeting #80bis, R1-151302, Belgrade, Serbia, Apr. 20-24, 2015, Source: Huawei, HiSilicon, Title: Support of UL transmission for LAA.

3GPP TSG RAN WG1 #80bis, R1-151404, Apr. 20-24, 2015, Belgrade, Serbia, Source: Qualcomm Incorporated, Title: Adaptive Frame Structure and DL-UL configuration for LAA.

3GPP TSG RAN WG1 Meeting #80bis, R1-151464, Belgrade, Serbia, Apr. 20-24, 2015, Source: Kyocera, Title: LAA UL Design.

3GPP TSG RAN WG1 meeting #80bis, R1-151516, Belgrade, Serbia, Apr. 20-24, 2015, Source: LG Electronics, Title: LBT operation for LAA UL.

3GPP TSG RAN WG1 Meeting #80bis, R1-151627, Belgrade, Serbia, Apr. 20-24, 2015, Source: Samsung, Title: Discussion on UL transmission for LAA.

3GPP TSG RAN WG1 Meeting #80bis, R1-151675, Belgrade, Serbia, Apr. 20-24, 2015, Source: Panasonic, Title: Discussion on UL transmission in LAA.

3GPP TSG RAN WG1 Meeting #80bis, R1-151719, Belgrade, Serbia, Apr. 20-24, 2015, Source: ZTE, Title: Potential design for LAA UL transmission.

3GPP TSG RAN WG1 #80bis, R1-151750, Belgrade, Serbia, Apr. 20-24, 2015, Source: NVIDIA, Title: Flexible UL-DL transmission for LAA.

3GPP TSG RAN WG1 Meeting #80bis, R1-151841, Belgrade, Serbia, Apr. 20-24, 2015, Source: Nokia Networks Title: On the PHY options for LAA UL operation.

3GPP TSG RAN WG1 Meeting #80bis, R1-151842, Belgrade, Serbia, Apr. 20-24, 2015, Source: Nokia Networks, Title: UL LBT and Configurable Frame Structure for UL/DL operation.

3GPP TSG RAN WG1 Meeting #80bis, R1-151958, Belgrade, Serbia, Apr. 20-24, 2015, Source: Ntt Docomo, Inc., Title: Discussion on issues related to UL transmission in LAA.

3GPP TSG RAN WG1 meeting #80bis, R1-151973, Belgrade, Serbia, Apr. 20-24, 2015, Source: Institute for Information Industry (III), Title: On the Design of LAA Uplink Transmission.

3GPP TSG RAN WG1 Meeting #80-bis, R1-152094, Belgrade, Serbia, Apr. 20-24, 2015 Source: ETRI, Title: Discussion on the UL transmission for LAA and the potential solution thereof.

3GPP TSG RAN WG1 Meeting #81, R1-152470, Fukuoka, Japan, May 25-29, 2015 Source: Huawei, HiSilicon, Title: Frame structure for LAA DL and UL transmission operation.

3GPP TSG RAN WG1 Meeting #81, R1-152579, Fukuoka, Japan, May 25-29, 2015, Source: CATT, Title: Frequency reuse for LBE.

3GPP TSG RAN WG1 Meeting #81, R1-152580, Fukuoka, Japan, May 25-29, 2015, Source: CATT, CATR, Title: Frame structure considerations for LAA.

3GPP TSG RAN WG1 Meeting #81, R1-152649, Fukuoka, Japan, May 25-29, 2015, Source: Intel Corporation, Title: On the LAA UL: LBT, scheduling, and sub-frame structure.

3GPP TSG RAN WG1 meeting #81, R1-152737, Fukuoka, Japan, May 25-29, 2015, Source: LG Electronics, Title: Indication of DL/UL TX burst structure.

3GPP TSG RAN WG1 #81, R1-152783, May 25-29, 2015, Fukuoka, Japan, Source: Qualcomm Incorporated, Title: Adaptive Frame Structure and DL-UL configuration for LAA.

3GPP TSG RAN WG1 #81, R1-152786, May 25-29, 2015, Fukuoka, Japan Source: Qualcomm Incorporated, Title: UE procedure for receiving DL transmissions in LAA.

R1-151297, 3GPP TSG RAN WG1 Meeting #80bis, Belgrade, Serbia, Apr. 20-24, 2015, Source: Huawei, HiSilicon, Title: Evaluation results of LAA fast carrier scheduling.

R1-152869, 3GPP TSG RAN WG1 #81, Fukuoka, Japan, May 25-29, 2015, Source: Samsung, Title: Discussion on carrier selection for LAA.

R1-153071, 3GPP TSG RAN WG1 Meeting #81, Fukuoka, Japan, May 25-29, 2015, Source: Ericsson, Title: Carrier Selection for CA enhancement.

R1-153230, 3GPP TSG RAN WG1 Meeting #81, Fukuoka, Japan, May 25-29, 2015, Source: Huawei, HiSilicon, Title: Design of fast carrier switching for LAA.

R1-153646, 3GPP TSG RAN WG1 Meeting #81, Fukuoka, Japan, May 25-29, 2015, Source: Huawei, HiSilicon, Title: Draft text proposal on fast carrier selection/switching for LAA.

R1-153788, 3GPP TSG RAN WG1 Meeting #82, Beijing, China, Aug. 24-28, 2015, Source: Huawei, HiSilicon, Title: Support for UE synchronization on a LAA SCell.

R1-154009, 3GPP TSG RAN WG1 Meeting #82, Beijing, China, Aug. 24-28, 2015, Source: Kyocera, Title: DL Transmission Design for LAA.

R1-154020, 3GPP TSG RAN WG1 Meeting #82, Beijing, China, Aug. 24-28, 2015, Source: Panasonic, Title: AGC and lime/ frequency synchronization for transmission burst.

R1-154146, 3GPP TSG RAN WG1 #82, Beijing, China, Aug. 24-28, 2015, Source: Samsung, Title: LAA synchronization.

R1-154149, 3GPP TSG RAN WG1 #82, Beijing, China, Aug. 24-28, 2015, Source: Samsung, Title: LAA fast carrier selection.

R1-154267, 3GPP TSG RAN WG1 meeting #82, Beijing, China, Aug. 24-28, 2015, Source: LG Electronics, Title: DL synchronization and AGC issues in LAA.

R1-154324, 3GPP TSG RAN WG1 Meeting #82, Beijing, China, Aug. 24-28, 2015, Source: Huawei, HiSilicon, Title: Support for carrier selection/switching in CA enhancement.

R1-154326, 3GPP TSG RAN WG1 Meeting #82, Beijing, China, Aug. 24-28, 2015, Source: Huawei, HiSilicon, Title: L1 indication for UE support of fast carrier selection.

R1-154327, 3GPP TSG RAN WG1 82 Meeting, Beijing, China, Aug. 24-28, 2015, Source: Huawei, HiSilicon, Title: UE support of carrier selection for LAA.

R1-154347, 3GPP TSG RAN WG1 Meeting #82, Beijing, China, Aug. 24-28, 2015, Source: Huawei, HiSilicon, Title: Carrier configuration for UE support of carrier selection.

R1-154635, 3GPP TSG RAN WG1 Meeting #82, Beijing, China, Aug. 24-28, 2015, Source: Ericsson, Title: Carrier Selection for LAA.

R2-152347, 3GPP TSG-RAN WG2 meeting #90, Fukuoka, Japan, May 25-29, 2015, Source: ZTE, Title: Initial Thoughts on (De)activation for LAA SCell.

R2-153313, 3GPP TSG-RAN WG2 Meeting #91, Beijing, China, Aug. 24-28, 2015, Source: Huawei, HiSilicon, Title: Supported functionalities and parameters for LAA cell.

R2-153523, 3GPP TSG-RAN WG2#91, Beijing, China, Aug. 24-28, 2015, Source: ZTE, Title: Further Thoughts on (De)activation of LAA SCell.

(56)  References Cited

OTHER PUBLICATIONS

R2-153569, 3GPP TSG-RAN WG2 #91, Aug. 24-28, 2015, Beijing, China, Source: NTT Docomo, Inc., Title: Discussion on deactivation for LAA.

R2-153779, 3GPP TSG-RAN WG2#91, Beijing, China, Aug. 24-28, 2015, Source: Samsung, Title: LAA SCell Aclivation and Deactivation.

R2-153799, 3GPP TSG-RAN WG2 Meeting #91, Beijing, China, Aug. 24-28, 2015, Source: KT Corp., Title: Discussion on LAA SCell Activation and Deactivation.

R1-160561, 3GPP TSG RAN WG1 Meeting #84, St Julian's, Malta, Feb. 15-19, 2016, Agenda item: 7.3.1.1, Source: Samsung, Title: Discussion on UL power control for UL LAA.

R1-152739, 3GPP TSG RAN WG1 meeting #81, Fukuoka, Japan, May 25-29, 2015, Agenda Item: 6.2.4.3, Source: LG Electronics, Title: UL power control in LAA.

R1-155472, 3GPP TSG RAN WG1 #82bis, Malmo, Sweden, Oct. 5-9, 2015, Agenda item: 7.2.3.3, Source: Samsung, Title: Impact of LAA dynamic power control.

R1-160886, 3GPP TSG RAN WG1 #84, Feb. 15-19, 2016, St. Julian's, Malta, Agenda item: 7.3.1.1, Source: Qualcomm Incorporated, Title: PUSCH power control.

R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.

R1-162662, 3GPP TSG RAN WG1 Meeting #84bis, Busan, Korea Apr. 11-15, 2016, Agenda Item: 7.3.1.1 Source: Samsung, Title: Discussion on UL power control for UL LAA.

R1-163023, 3GPP TSG RAN WG1 #84bis, Apr. 11-15, 2016, Busan, Korea, Agenda item: 7.3.1.1, Source: Qualcomm Incorporated, Title: PUSCH power control.

R1-163762, 3GPP TSG RAN WG1 #84bis, Busan, Korea, Apr. 11-15, 2016, Agenda item: 7.3.1.6, WF on uplink power control in LAA.

R1-164918, 3GPP TSG-RAN WG1 Meeting #85, Nanjing, China, May 23-27, 2016, Agenda item: 6.2.1.1, Source: Nokia, Alcatel-Lucent Shanghai Bell, Title: On PUSCH Transmit Power on LAA SCells.

R1-165557, 3GPP TSG RAN WG1 #85, Nanjing, China, May 23-27, 2016, Agenda item: 6.2.1.1, WF on uplink power control in LAA.

R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.

Rp-141188, 3GPP TSG RAN Meeting #65, Edinburgh, Scotland, Sep. 9-12, 2014, Source: ZTE, Title: Supporting dual connectivity in LTE-U.

Samsung, "Text Proposal for PHR in dual connectivity", May 19-23, 2014, pp. 1-7, 3GPP TSG RAN WG2 #86, R2-142275, Seoul, Korea.

Japanese Office Action mailed Jan. 30, 2018 in Japanese Patent Application No. 2017-546998.

R2-140066, 3GPP TSG RAN WG2 Meeting #85, Prague, Czech Republic, Feb. 10-14, 2014, Title: Consideration on PHR for TDD eiMTA.

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.

3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.

3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.

3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.

3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.

3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.

3GPP TSG RAN WG1 Meeting #80 R1-150102, Athens, Greece, Feb. 9-13, 2015, Source: CATT, Title: Uplink power control to support PUCCH on SCell for Rel-13 CA.

3GPP TSG RAN WG1 Meeting #80bis R1-15xxxx, Belgrade, Serbia, Apr. 20-24, 2015, Source: MCC Support, Title: Draft Report of 3GPP TSG RAN WG1 #80 v0.2.0, Athens, Greece, Feb. 9-13, 2015.

3GPP TSG RAN WG2 Meeting #89 R2-150169, Athens, Greece, Feb. 9-13, 2015, Source: Intel Corporation, Title: Considerations for PUCCH on SCell in carrier aggregation.

3GPP TSG RAN WG1 #80 R1-150085, Athens, Greece, Feb. 9-13, 2015, Source: Intel Corporation, Title: Support of PUCCH on SCell for CA.

3GPP TSG RAN WG1#80 R1-150321, Athens, Greece, Feb. 9-13, 2015, Source: Ericsson, Title: PUCCH on SCell or carrier aggregation.

3GPP TSG RAN WG2 #89 R2-150112, Feb. 9-13, 2015, Athens, Greece, Source: NTT Docomo, Inc., Title: Discussion on PUCCH on SCell.

3GPP TSG RAN WG2 Meeting #90 R2-152742, Fukuoka, Japan, May 25-29, 2015, Source: Qualcomm Incorporated, Title: Dual SR Procedures.

3GPP TSG RAN2 #89bis Meeting R2-151252, Bratislava, Slovakia, Apr. 20-24, 2015, Source: MediaTek Inc., Title: Remaining issues for PUCCH on SCell.

3GPP TSG-RAN2 #90 Meeting R2-152138, Fukuoka, Japan, May 25-29, 2015, Source: MediaTek Inc., Title: Remaining UP issues for PUCCH on SCell.

3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.

R1-156047, 3GPP TSG RAN WG1 Meeting #82bis, Malmo, Sweden, Oct. 5-9, 2015, Source: Ericsson, Title: On Support of Multiple DL Data Transmission Starting Points.

R1-156043, 3GPP TSG RAN WG1 Meeting #82bis, Malmo, Sweden, Oct. 5-9, 2015, Source: Ericsson, Title: On Dynamic DL/UL Scheduling.

R1-155902, 3GPP TSG RAN WG1 Meeting #82bis, Malmo, Sweden, Oct. 5-9, 2015, Source: Ntt Docomo, Inc., Title: Discussion on discontinuous transmission and scheduling design for LAA DL.

R1-155781, 3GPP TSG RAN WG1#82bis, Oct. 5-9, 2015, Malmo, Sweden, Source: Motorola Mobility, Title: PDSCH Transmission options for LAA.

R1-155629, 3GPP TSG RAN WG1 Meeting #82bis, Malmo, Sweden, Oct. 5-9, 2015, Source: Alcatel-Lucent, Alcatel-Lucent Shanghai Bell, Title: POSCH and DCI Transmissions in LAA.

R1-155570, 3GPP TSG RAN WG1 Meeting #82bis, Malmo, Sweden, Oct. 5-9, 2015, Source: Sharp, Title: Scheduling methods for LAA SCell.

R1-155569, 3GPP TSG RAN WG1 Meeting #82bis, Malmo, Sweden, Oct. 5-9, 2015, Source: Sharp, Title: Subframe structure for LAA discontinuous transmission.

R1-155531, 3GPP TSG RAN WG1 Meeting #82bis, Malmo, Sweden, Oct. 5-9, 2015, Source: Kyocera, Title: DL Transmission Design for partial subframe.

(56) References Cited

OTHER PUBLICATIONS

R1-155529, 3GPP TSG-RAN WG1 Meeting #82bis, Malmo, Sweden, Oct. 5-9, 2015, Source: InterDigital Communications, Title: On LAA scheduling.

R1-155474, 3GPP TSG RAN WG1 #82bis, Malmo, Sweden, Oct. 5-9, 2015, Source: Samsung, Title: Partial subframe for LAA.

R1-155468, 3GPP TSG RAN WG1 #82bis, Malmo, Sweden, Oct. 5-9, 2015, Source: Samsung, Title: LAA transmission burst structure and signaling.

R1-155389, 3GPP TSG RAN WG1 meeting #82bis, Malmo, Sweden, Oct. 5-9, 2015, Source: LG Electronics, Title: DL transmission structure in LAA.

R1-155316, 3GPP TSG RAN WG1 Meeting #82bis, Malmo, Sweden, Oct. 5-9, 2015, Source: Intel Corporation, Title: DL sub-frame structure and (e)PDCCH.

R1-155103, 3GPP TSG RAN WG1 Meeting #82bis, Malmo, Sweden, Oct. 5-9, 2015, Source: Huawei, HiSilicon, Title: Candidate starting/ending positions of partial subframe and corresponding indication for LAA.

R1-154150, 3GPP TSG RAN WG1 #82, Beijing, China, Aug. 24-28, 2015, Source: Samsung, Title: Partial subframe for LAA.

R1-153787, 3GPP TSG RAN WG1 Meeting #82, Beijing, China, Aug. 24-28, 2015, Source: Huawei, HiSilicon, Title: Candidate starting positions of partial subframe and corresponding RS pattern for LAA.

R1-153786, 3GPP TSG RAN WG1 Meeting #82, Beijing, China, Aug. 24-28, 2015, Source: Huawei, HiSilicon, Title: Indication of DL transmission burst duration for LAA.

3GPP TS 36.213 V12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12).

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

3GPP TSG RAN WG1 Meeting #83 R1-157531, Anaheim, USA, Nov. 16-20, 2015, Source: Ericsson, Title: On Energy Detection Threshold for LAA.

3GPP TS 36.211 V13.0.0 (Dec. 2015), Technical Specification, 3rd Generation Partnership Project; Technical Specification Group Radio Access Network; Evolved Universal Terrestrial Radio Access (E-UTRA); Physical channels and modulation (Release 13).

3GPP TS 36.212 V13.0.0 (Dec. 2015), Technical Specification, 3rd Generation Partnership Project; Technical Specification Group Radio Access Network; Evolved Universal Terrestrial Radio Access (E-UTRA); Multiplexing and channel coding, (Release 13).

3GPP TS 36.213 V13.0.1 (2016-01), Release 13, Technical Specification (TS).

3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).

3GPP TS 36.321 V13.0.0 (Dec. 2015), Technical Specification, 3rd Generation Partnership Project; Technical Specification Group Radio Access Network; Evolved Universal Terrestrial Radio Access (E-UTRA); Medium Access Control (MAC) protocol specification, (Release 13).

3GPP TS 36.331 V13.0.0 (Dec. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 13).

3GPP TSG RAN WG1 #82, R1-154139, Beijing, China, Aug. 24-28, 2015, Title: CCA threshold and transmission power for LAA.

3GPP TSG RAN WG1 #82bis R1-155460, Malmo, Sweden, Oct. 5-9, 2015, Source: Samsung, Title: LAA energy detection adaptation.

3GPP TSG RAN WG1 #82bis, R1-155721, Oct. 5-9, 2015, Malmo, Sweden, Agenda item: 7.2.3.1, Source: Qualcomm Incorporated Title: Adaptive ED threshold setting.

3GPP TSG RAN WG1 #82bis, R1-155722, Oct. 5-9, 2015, Malmo, Sweden, Agenda item: 7.2.3.1, Source: Qualcomm Incorporated Title: Remaining details of UL LBT operation.

3GPP TSG RAN WG1 #82bis, R1-155724, Oct. 5-9, 2015, Malmo, Sweden, Agenda item: 7.2.3.1, Source: Qualcomm Incorporated, Title: Multi-carrier LBT operation.

3GPP TSG RAN WG1 #83 R1-156489, Nov. 15-22, 2015, Anaheim, USA, Agenda item: 6.2.3.1, Source: Cisco Systems, Title: Views on Energy Detection Threshold Adaptation.

3GPP TSG RAN WG1 #83 R1- 156490, Nov. 15-22, 2015, Anaheim, USA, Agenda item: 6.2.3.1, Source: Cisco Systems, Title: Views on Multi-Channel Access for LAA.

3GPP TSG RAN WG1 #83 R1-156763, Anaheim, California, US, Nov. 15-22, 2015, Agenda item: 6.2.3.1, Source: Samsung, Title: LAA Multi-Channel LBT.

3GPP TSG RAN WG1 #83 R1-157036, Nov. 14-22, 2015, Anaheim, USA, Agenda item: 6.2.3.1, Source: Qualcomm Incorporated, Title: Adaptive ED threshold setting.

3GPP TSG RAN WG1 #83 R1-157039, Nov. 14-22, 2015, Anaheim, USA, Agenda item: 6.2.3.1, Source: Qualcomm Incorporated, Title: Multicarrier LBT operation.

3GPP TSG RAN WG1 82bis Meeting, R1-155096, Malmo, Sweden, Oct. 5-9, 2015, Title: Evaluations for energy detection threshold.

3GPP TSG RAN WG1 82bis Meeting, R1-155097, Malmo, Sweden, Oct. 5-9, 2015, Title: Adaptation rules of energy detection threshold.

3GPP TSG RAN WG1 83 Meeting R1-156914, Anaheim, USA, Nov. 15-22, 2015, Agenda Item: 6.2.3.1, Source: Huawei, HiSilicon, Title: Remaining LBT parameters for LAA DL.

3GPP TSG RAN WG1 83 Meeting, R1-156437, Anaheim, USA, Nov. 15-22, 2015, Agenda Item: 6.2.3.1, Source: Huawei, HiSilicon, Title: Adaptation rules of energy detection threshold.

3GPP TSG RAN WG1 Meeting #81, R1-152581, Fukuoka, Japan, May 25-29, 2015, Source: CATT, Title: Discontinuous transmission for LAA.

3GPP TSG RAN WG1 Meeting #81, R1-152816, Fukuoka, Japan, May 25-29, 2015, Source: Nokia Networks, Title: On the remaining PHY issues for LAA UL operation.

3GPP TSG RAN WG1 Meeting #81, R1-152970, Fukuoka, Japan, May 25-29, 2015, Source: ZTE, Title: Overview on LAA UL.

3GPP TSG RAN WG1 Meeting #82b R1-156981, Anaheim, CA, Nov. 15-22, 2015, Agenda item: 6.2.3.1, Source: CableLabs, Title: Limitations of Multi-carrier Allocation Scheduling.

3GPP TSG RAN WG1 Meeting #82bis, R1-155592, Malmö, Sweden, Oct. 5-9, 2015, Agenda item: 7.2.3.1, Source: HTC, Title: Discussion on Adaptation Rules of the Maximum Energy Detection Threshold in LAA Coexistence.

3GPP TSG RAN WG1 Meeting #82bis, R1-155310, Malmö, Sweden, Oct. 5-9, 2015, Agenda Item: 7.2.3.1, Title: Energy detection threshold for LAA.

3GPP TSG RAN WG1 #80 R1-150357, Athens, Greece, Feb. 9-13, 2015, Agenda item: 7.2.2.1, Source: Samsung, Title: PUCCH Transmission on SCell for CA.

3GPP TSG RAN WG1 #80 R1-150361, Athens, Greece, Feb. 9-13, 2015, Agenda item: 7.2.2.2.3, Source: Samsung, Title: CSI Transmission for Enhanced CA.

3GPP TSG RAN WG1 #80 R1-150468, Feb. 9-13, 2015, Athens, Greece, Agenda item: 7.2.2.1, Source: Qualcomm Incorporated, Title: PUCCH on SCell.

3GPP TSG RAN WG1 #80 R1-150473, February Feb. 9-13, 2015, Athens, Greece, Agenda item: 7.2.2.2.3, Source: Qualcomm Incorporated, Title: CSI feedback for up to 32 component carriers.

3GPP TSG RAN WG1 #80 R1-150742, February Feb. 9-13, 2015, Athens, Greece, Agenda item: 7.2.2.2.3, Source: Qualcomm Incorporated, Title: HARQ ACK for up to 32 DL Carriers.

3GPP TSG RAN WG1 #80 R1-150823, Athens, Greece, Feb. 9-13, 2015, Title: WF on PUCCH on SCell for CA, Source: NTT Docomo, NEC, Sharp, Softbank Mobile, Intel, Ericsson, KDDI.

(56) References Cited

OTHER PUBLICATIONS

3GPP TSG RAN WG1 #80, Athens, Greece, Feb. 9-13, 2015, R1-150822, Title: Way Forward on PUCCH on SCell for CA, Source: Ericsson, NEC, Sharp, NTT Docomo, ZTE.

3GPP TSG RAN WG1 #80, Athens, Greece, Feb. 9-13, 2015, R1-150926, Title: WF on target scenarios for UCI feedback design, Source: Ericsson, CATT.

3GPP TSG RAN WG1 Meeting #80 R1-150101, Athens, Greece, Feb. 9-13, 2015, Source: CATT, Title: PUCCH on SCell for Rel-13 CA.

3GPP TSG RAN WG1 Meeting #80 R1-150103, Athens, Greece, Feb. 9-13, 2015, Source: CATT, Title: Enhancements to support carrier aggregation with up to 32 component carriers.

3GPP TSG RAN WG1 Meeting #80 R1-150106, Athens, Greece, Feb. 9-13, 2015, Source: CATT, Title: Periodic CSI feedback for Rel-13 CA.

3GPP TSG RAN WG1 Meeting #80 R1-150135, Athens, Greece, Feb. 9-13, 2015, Source: ZTE, Title: Further CA enhancement to support PUCCH on SCell.

3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.

3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.

3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.

3GPP TSG RAN WG1 Meeting #80 R1-150276, Athens, Greece, Feb. 9-13, 2015, Source: Sharp, Title: Considerations on PUCCH for Rel-13 CA.

3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.

3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component .carriers.

3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.

3GPP TSG RAN WG1 Meeting #80 R1-150489, Athens, Greece, Nov. 17-21, 2014, Source: ITL Inc., Title: Uplink control signaling enhancements for b5C CA.

3GPP TSG RAN WG1 Meeting #80 R1-150509, Athens, Greece, Feb. 9-13, 2015, Source: NTT Docomo, NC., Title: PUCCH on SCell for UEs supporting UL-CA.

3GPP TSG RAN WG1 Meeting #80 R1-150510, Athens, Greece, Feb. 9-13, 2015, Source: NTT Docomo, NC., Title: Initial views on CA enhancements to support up to 32 component carriers.

3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.

3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT Docomo.

3GPP TSG RAN WG1 #80 R1-150086, Athens, Greece, Feb. 9-13, 2015, Source: Intel Corporation, Title: Discussion on CA enhancement for release 13.

3GPP TSG RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.

3GPP TSG RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.

3GPP TSG RAN WG1 Meeting #80 R1-150455, Athens, Greece, Feb. 9-13, 2015, Agenda item: 7.2.2.2.3, Source: Nokia Networks, Nokia Corporation, Title: CSI reporting for Carrier Aggregation Enhancement Beyond 5 Carriers.

3GPP TSG RAN WG1#80 R1-150324, Athens, Greece, Feb. 9-13, 2015, Source: Ericsson, Title: UL control signaling enhancements for up to 32 CCs.

3GPP TSG RAN WG2 Meeting#89 R2-150134, Feb. 9-13, 2015, Athens, Greece, Source: Institute for Information Industry (III), Title: Partition UGI feedback.

3GPP TSG RAN WG2 #89 bis R2-151304, 20.4. to 24.5.2015, Bratislava, Slovakia, Source: ITRI, Title: Discussion on SR on PUCCH SCell.

3GPP TSG RAN WG2 #89bis R2-151637, Apr. 20 to 24, 2015, Bratislava, Slovakia, Source: Samsung, Title: SR support for CA enhancements.

3GPP TSG RAN WG2 #90 R2-152712, May 25 to 29, 2015, Fukuoka, Japan, Source: Samsung, Title: How to support SR in PUCCH SCell.

3GPP TSG RAN WG2 Meeting #89bis R2-151430, Bratislava, Slovakia, Apr. 20-24, 2015, Source: NEC, Title: SR on PUCCH SCell.

3GPP TSG RAN WG2 Meeting #89bis R2-151104, Bratislava, Slovakia, Apr. 20-24, 2015, Source: Intel Corporation, Title: Control plane aspects of support PUCCH on SCell.

3GPP TSG RAN WG2 Meeting #89bis R2-151342, Bratislava, Slovakia, Apr. 20-24, 2015, Source: CATT, Title: D-SR on PUCCH SCell.

3GPP TSG RAN WG2 Meeting #90 R2-152277, Fukuoka, Japan, May 25-29, 2015, Source: CATT, Title: D-SR on PUCCH SCell.

3GPP TSG RAN WG2 Meeting #90 R2-152512, Fukuoka, Japan, May 25-29, 2015, Source: NEC, Title: Potential issues of SR on PUCCH SCell.

3GPP TSG RAN2 Meeting #90 R2-152524, Fukuoka, Japan, May 25-29, 2015, Source: NEC, Title: Overlapping of D-SR resources.

3GPP TSG RAN WG2 #89bis R2-151495, Bratislava, Slovakia, Apr. 20-24, 2015, Source: HTC, Title: PUCCH SCell management.

3GPP TSG RAN WG2 #89bis Tdoc R2-151488, Bratislava, Slovakia, Apr. 20-24, 2015, Source: Ericsson, Title: SR on PUCCH SCell.

3GPP TSG RAN WG2 #90 R2- 152418, Fukuoka, Japan, May 25-29, 2015, Source: HTC, Title: Managing PUCCH resources on a deactivated PUCCH SCell.

3GPP TSG RAN WG2 #90 Tdoc R2-152530, Fukuoka, Japan, May 25-29, 2015, Source: Ericsson, Title: SR on PUCCH SCell.

3GPP TSG RAN WG2 Meeting #89bis R2-151211, Bratislava, Slovakia, Apr. 20-24, 2015, Source: Nokia Networks, Title: SR on SCell.

3GPP TSG RAN WG2 Meeting #89bis R2-151324, Bratislava, Slovakia, Apr. 20-24, 2015, Source: Huawei, HiSilicon, Title: Leftover issues for PUCCH on SCell.

3GPP TSG RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.

3GPP TSG RAN WG2 Meeting #90 R2-152273, Fukuoka, Japan, May 25-29, 2015, Source: Huawei, HiSilicon, Title: Issues for SR on PUCCH SCell.

3GPP TSG RAN WG2 Meeting #90 R2-152302, Fukuoka, Japan, May 25-29, 2015, Source: Nokia Networks, Title: SR on PUCCH SCell.

3GPP TSG RAN WG2 Meeting #90 R2-152310, Fukuoka, Japan, May 25-29, 2015, Source: Nokia Networks, Title: PUCCH SCell pre-activation.

3GPP TSG RAN WG2 Meeting #90 R2-152366, Fukuoka, Japan, May 25-29, 2015, Source: LG Electronics Inc., Title: SR for CA enhancement.

3GPP TSG RAN WG2 #89 Tdoc R2-150389, Athens, Greece, Feb. 9-13, 2015, Source: Ericsson, Title: PUCCH on SCell.

(56)  References Cited

OTHER PUBLICATIONS

3GPP TSG RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.

3GPP TSG RAN WG2 Meeting #89 R2-150527, Athens, Greece, Feb. 9-13, 2015, Source: Qualcomm Incorporated, Title: General principles for the support of PUCCH on SCell.

3GPP TSG RAN WG2 Meeting #89 R2-150151, Athens, Greece, Feb. 9-13, 2015, Source: ZTE, Title: Discussion on the impact for the support of PUCCH on SCell, Agenda item: 7.2.

3GPP TSG RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.

3GPP TSG RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5G-Core- Release 13.

3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.

3GPP TSG RAN WG1 Meeting #81 R1-153295, Fukuoka, Japan, May 25-29, 2015, Source: Institute for Information Industry (III), Title: Discussion on Dynamic Selection of SR PUCCH Resources.

3GPP TSG RAN WG2 Meeting #89 R2-150264, Athens, Greece, Feb. 9-13, 2015, Source: CATT, Title: Discussion on the functionality of PUCCH SCell.

3GPP TSG RAN WG2 Meeting RAN2#89, Athens, Greece, Feb. 9-13, 2015, R2-150403, Agenda Item: 7.2, Source: NEC, Title: PUCCH on SCell.

3GPP TSG RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.

3GPP TSG RAN WG2 Meeting #89 R2-150278, Athens, Greece, Feb. 9-13, 2015, Source: Microsoft Corporation, Title: SCell PUCCH for CA.

3GPP TSG RAN WG2 Meeting #89 R2-150372, Athens, Greece, Feb. 9-13, 2015, Source: Huawei, HiSilicon, Title: Introduce PUCCH on SCell for CA beyond 5 carriers.

3GPP TSG RAN WG2 Meeting #90 R2-152513, Fukuoka, Japan, May 25-29, 2015, Title: SR on PUCCH-SCell, Source to WG: Ericsson.

3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code: LTE-L23.

3GPP TSG-RAN2#72 meeting Tdoc XR2-106513, Jacksonville, U.S. Nov. 15-19, 2010, Agenda Item: 7.1.4.3, Source: Samsung, Title: SR handling in CA.

Jan. 24, 2018—Japanese Office Action—JP 2017-546843.

Apr. 5, 2018—Korean Office Action—KR 2017-7025399.

3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.

3GPP TSG RAN WG2 Meeting #89 R2-150150, Athens, Greece, Feb. 9-13, 2015, Source: ZTE, Title: Activation/Deactivation for SCell carrying PUCCH.

3GPP TSG RAN WG2 Meeting #89 R2-150263, Athens, Greece, Feb. 9-13, 2015, Source: CATT, Title: Introduction of PUCCH Cell Group.

3GPP TSG-RAN WG2 #87, Aug. 18-22, 2014, Dresden, Germany, R2-143073, Update of R2-141967, Source: NTT Docomo, Inc, Title: Support of PUCCH on SCell for CA—RAN2 aspects.

3GPP TSG RAN WG2 Meeting #72bis, Dublin, Ireland, Jan. 17-21, 2011, R2-110113, Agenda item: 7.1.4, Source: Huawei, Title: CQI Reporting at Activation.

3GPP TSG RAN WG2 Meeting #87, Aug. 18-22, 2014, Dresden, Germany, R2-143117, Agenda Item: 6.1.2, Source: Samsung, Title: Discussion on PHR triggering due to SCell activation.

3GPP TSG RAN WG2 Meeting #89 R2-150186, Athens, Greece, Feb. 9-13, 2015, Source: Nokia Corporation, Nokia Networks, Title: PUCCH SCell RLM and activation/deactivation.

3GPP TSG RAN WG2 Meeting #89 R2-150277, Athens, Greece, Feb. 9-13, 2015, Source: KT Corp., Title: Activation/ deactivation of SCell carrying PUCCH.

3GPP TSG RAN WG2 Meeting#89 R2-150238, Athens, Greece, Feb. 9-13, 2015, Agenda Item: 7.2, Source: Fujitsu, Title: Discussion on the PUCCH support on SCell.

3GPP TSG RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.

3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.

3GPP TSG-RAN1#64 meeting R1-110721, Taipei, Taiwan, Feb. 21-25, 2011, Agenda item: 4, Source: Samsung, Title: CQi reporting at SCell activation.

3GPP TSG RAN WG2 Meeting #89 R2-150380, Athens, Greece, Feb. 9-13, 2015, Source: LG Electronics Inc., Title: Potential issues in MAC for CA enhancement.

3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.

3GPP TSG RAN WG1 #80 R1-150359, Athens, Greece, Feb. 9-13, 2015, Agenda item: 7.2.2.2.2, Source: Samsung, Title: Enhancements to DL control signaling for CA with up to 32 CCs.

3GPP TSG RAN WG1 Meeting #80 R1-150104, Athens, Greece, Feb. 9-13, 2015, Source: CATT, Title: Enhancements to DL control signaling for Rel-13 CA.

3GPP TSG RAN WG1 Meeting #80 R1-150137, Athens, Greece, Feb. 9-13, 2015, Source: ZTE, Title: PDCCH/EPDCCH enhancements for Carrier Aggregation.

3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.

3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.

3GPP TSG RAN WG1 Meeting #80 R1-150277, Athens, Greece, Feb. 9-13, 2015, Source: Sharp, Title: Considerations on DL Control Signaling for Rel-13 CA.

3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.

3GPP TSG RAN WG1 Meeting #80 R1-150315, Athens, Greece, Feb. 9-13, 2015, Source: Panasonic, Title: identified DL aspects for CA beyond 5 carriers.

3GPP TSG RAN WG1 Meeting #80 R1-150437, Athens, Greece, Feb. 9-13, 2015, Source: CMCC, Title: Design principle to support CA up to 32 carriers.

3GPP TSG RAN WG1 Meeting #80 R1-150523, Athens, Greece, Feb. 9-13, 2015, Agenda item: 7.2.2.2.2, Source: HTC, Title: DL control signaling for CA up to 32 CCs.

3GPP TSG RAN WG1 Meeting #80 R1-150593, Athens, Greece, Feb. 9-13, 2015, Source: NTT Docomo, Inc., Title: Necessary enhancements to enable LTE CA of up to 32CCs for DL and UL.

3GPP TSG RAN WG1 Meeting #80 R1-150824, Athens, Feb. 9-13, 2015, Title: Observations on Necessary Enhancements to DL control signaling, Source: Nokia Corporation, Nokia Networks, NTT DOCOMO.

3GPP TSG RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.

(56) References Cited

OTHER PUBLICATIONS

3GPP TSG RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.

3GPP TSG RAN WG1#80 R1-150323, Athens, Greece, Feb. 9-13, 2015, Source: Ericsson, Title: DL control signaling enhancements for up to 32 CCs.

3GPP TSG RAN WG2 meeting #89 R2-150149, Athens, Greece, Feb. 9-13, 2015, Source: ZTE, Title: The principle of grouping PUCCH cell.

3GPP TSG-RAN2 #89 Meeting R2-150289, Athens, Greece, Feb. 9-13, 2015, Source: MediaTek Inc., Title: Cross-carrier scheduling for CA enhancement beyond 5CCs.

3GPP TSG-RAN2 #89 Meeting R2-150290, Athens, Greece, Feb. 9-13, 2015, Source: MediaTek Inc., Title: PUCCH on SCell for CA enhancement beyond 5CCs.

R1-164572 3GPP TSG RAN WG1 Meeting #85, Nanjing, China, May 23-27, 2016, Source: ZTE, Title: HARQ for UL LAA.

3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).

3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).

3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).

3GPP TS 36.300 V14.0.0 (Sep. 2016), Technical Specification, 3rd Generation Partnership Project; Technical Specification Group Radio Access Network; Evolved Universal Terrestrial Radio Access (E-UTRA) and Evolved Universal Terrestrial Radio Access Netowork (E-UTRAN); Overall description; Stage 2 (Release 14).

3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

IEEE 802 Interim Session, Atlanta, USA, Jan. 11-16, 2015, Source: Dino Flore, Qualcomm Technologies Inc., Title: 3GPP & Unlicensed Spectrum.

R1-160358 3GPP TSG RAN WG1 Meeting #84, St. Julian's, Malta, Feb. 15-19, 2016, Source: CATT, Title: Support of PRACH for LAA Scell.

R1-160564 3GPP TSG RAN WG1 Meeting #84, St. Julian's, Malta, Feb. 15-19, 2016, Source: Samsung, Title: Discussion on RA procedure for UL LAA.

R1-160565 3GPP TSG RAN WG1 Meeting #84, St. Julian's, Malta, Feb. 15-19, 2016, Source: Samsung, Title: Discussion on PRACH for UL LAA.

R1-160625 3GPP TSG RAN WG1 Meeting #84, St. Julian's, Malta, Feb. 15-19, 2016, Source: LG Electronics, Title: Random Access in LAA.

R1-160797 3GPP TSG RAN WG1 Meeting #84, St. Julian's, Malta, Feb. 15-19, 2016, Source: Panasonic, Title: PRACH on Unlicensed Carriers.

R1-160883 3GPP TSG RAN WG1 Meeting #84, St. Julian's, Malta, Feb. 15-19, 2016, Source: Qualcomm Incorporated, Title: Random Access Channel Design.

R1-160950 3GPP TSG RAN WG1 Meeting #84, St. Julian's, Malta, Feb. 15-19, 2016, Source: NTT Docomo, Inc., Title: Discussion on PRACH for eLAA UL.

R1-160961 3GPP TSG RAN WG1 Meeting #84, St. Julian's, Malta, Feb. 15-19, 2016, Source: Coolpad, Title: Discussion on PUSCH and PRACH for eLAA.

R1-160975 3GPP TSG RAN WG1 Meeting #84, St. Julian's, Malta, Feb. 15-19, 2016, Source: MediaTek Inc., Title: Considerations on PRACH for LAA.

R1-160999 3GPP TSG RAN WG1 Meeting #84, St. Julian's, Malta, Feb. 15-19, 2016, Source: Ericsson, Title: PRACH Design for Enhanced LAA.

R1-162132 3GPP TSG RAN WG1 Meeting #84bis, Busan, Korea, Apr. 11-15, 2016, Source: Huawei, HiSilicon, Title: PRACH for eLAA.

R1-162145 3GPP TSG RAN WG1 Meeting #84bis, Busan, Korea, Apr. 11-15, 2016, Source: Huawei, HiSilicon, Title: Overview of Radio Access Mechanism for 5G.

R1-162263 3GPP TSG RAN WG1 Meeting #84bis, Busan, Korea, Apr. 11-15, 2016, Source: CATT, Title: Support of PRACH for Rel-14 eLAA.

R1-162326 3GPP TSG RAN WG1 Meeting #84bis, Busan, Korea, Apr. 11-15, 2016, Source: ZTE Microelectronics Technology, Nubia Technology, Title: PRACH Design for LAA.

R1-162358 3GPP TSG RAN WG1 Meeting #84bis, Busan, Korea, Apr. 11-15, 2016, Source: Intel Corporation, Title: PRACH Design for eLAA.

R1-162470 3GPP TSG RAN WG1 Meeting #84bis, Busan, Korea, Apr. 11-15, 2016, Source: LG Electronics, Title: Random access preamble in LAA.

R1-162471 3GPP TSG RAN WG1 Meeting #84bis, Busan, Korea, Apr. 11-15, 2016, Source: LG Electronics, Title: Random access procedure in LAA.

R1-162527 3GPP TSG RAN WG1 Meeting #84bis, Busan, Korea, Apr. 11-15, 2016, Source: HTC, Title: Discussion on PRACH design for LAA.

R1-162619 3GPP TSG RAN WG1 Meeting #84bis, Busan, Korea, Apr. 11-15, 2016, Source: Huawei, HiSilicon, Title: PRACH enhancement in high speed scenario.

R1-162668 3GPP TSG RAN WG1 Meeting #84bis, Busan, Korea, Apr. 11-15, 2016, Source: Samsung, Title: PRACH Transmission Aspects.

R1-162803 3GPP TSG RAN WG1 Meeting #84bis, Busan, Korea, Apr. 11-15, 2016, Source: NTT Docomo, Inc., Title: Discussion on PRACH for eLAA ULL.

R1-162919 3GPP TSG RAN WG1 Meeting #84bis, Busan, Korea, Apr. 11-15, 2016, Source: Nokia, Alcatel-Lucent Shanghai Bell, Title: Discussion on PRACH design for eLAA.

R1-162940 3GPP TSG RAN WG1 Meeting #84bis, Busan, Korea, Apr. 11-15, 2016, Source: MediaTek Inc., Title: PRACH design in eLAA.

R1-162995 3GPP TSG RAN WG1 Meeting #84bis, Busan, Korea, Apr. 11-15, 2016, Source: Coolpad, Title: Discussion on PRACH for eLAA.

R1-163026 3GPP TSG RAN WG1 Meeting #84bis, Busan, Korea, Apr. 11-15, 2016, Source: Qualcomm Incorporated, Title: PRACH design details.

R1-163821 3GPP TSG RAN WG1 Meeting #84bis, Busan, Korea, Apr. 11-15, 2016, Source: Ericsson, Title: On Performance of PRACH for Enhanced LAA.

R2-162231 3GPP TSG RAN WG2 Meeting #93bis, Dubrovnik, Croatia, Apr. 11-15, 2016, Source: IAESI, Thales, Fairspectrum, Title: High level view of 5G access architecture.

R2-162300 3GPP TSG RAN WG2 Meeting #93bis, Dubrovnik, Croatia, Apr. 11-15, 2016, Source: Samsung, Title: Preliminary View on Initial Access in 5G.

R2-162367 3GPP TSG RAN WG2 Meeting #93bis, Dubrovnik, Croatia, Apr. 11-15, 2016, Source: Samsung, Title: Preliminary View on Initial Access in 5G.

R2-162393 3GPP TSG RAN WG2 Meeting #93bis, Dubrovnik, Croatia, Apr. 11-15, 2016, Source: Samsung, Title: Random Access for eLAA.

R2-162428 3GPP TSG RAN WG2 Meeting #93bis, Dubrovnik, Croatia, Apr. 11-15, 2016, Source: Huawei, HiSilicon, Title: Considerations on RACH for LAA SCell.

(56)                References Cited

OTHER PUBLICATIONS

R2-162471 3GPP TSG RAN WG2 Meeting #93bis, Dubrovnik, Croatia, Apr. 11-15, 2016, Source: Intel Corporation, Title: RACH procedure for UL LAA.

R2-162745 3GPP TSG RAN WG2 Meeting #93bis, Dubrovnik, Croatia, Apr. 11-15, 2016, Source: Ericsson, Title: Impact on Random Access due to LBT.

R2-162763 3GPP TSG RAN WG2 Meeting #93bis, Dubrovnik, Croatia, Apr. 11-15, 2016, Source: Ericsson, Title: Initial Considerations on NR system access.

R2-162895 3GPP TSG RAN WG2 Meeting #93bis, Dubrovnik, Croatia, Apr. 11-15, 2016, Source: LG Electronics, Inc., Title: Random access aspect in LAA.

R2-162911 3GPP TSG RAN WG2 Meeting #93bis, Dubrovnik, Croatia, Apr. 11-15, 2016, Source: Qualcomm Incorporated, Title: RACH Procedure for Enhanced LAA.

3GPP TSG RAN WG1 Meeting #81, R1-152817, Fukuoka, Japan, May 25-29, 2015 Source: Nokia Networks, Title: UL LBT and Configurable Frame Structure for UL/DL operation.

3GPP TSG RAN WG1 Meeting #81, R1-152872, Fukuoka, Japan, May 25-29, 2015, Source: Samsung, Title: Discussion on UL transmission for LAA.

3GPP TSG RAN WG1 Meeting #81, R1-152971, Fukuoka, Japan, May 25-29, 2015, Source: ZTE, Title: Remaining Issues on LAA UL.

3GPP TSG RAN WG1 Meeting #81, R1-152990, Fukuoka, Japan, May 25-29, 2015, Title: LBT and Frame Structure Design for LAA with DL and UL Source: Alcatel-Lucent Shanghai Bell, Alcatel Lucent.

3GPP TSG RAN WG1 Meeting #80bis, R1-151459, Belgrade, Serbia, Apr. 20-24, 2015, Source: InterDigital Communications, Title: UL transmission for LAA.

R1-162858, 3GPP TSG RAN WG1 Meeting #84bis, Busan, Korea Apr. 11-15, 2016, Source: CMCC, Title: Further discussion on issues related to PUSCH transmission for LAA.

R1-160388, 3GPP TSG RAN WG1 Meeting #84, St Julian's, Malta, Feb. 15-19, 2016, Agenda Item: 7.3.1.1, Source: NEC, Title: Discussion on LAA UL transmission.

R1-160796, 3GPP TSG-RAN WG1 Meeting 84, Feb. 15-19, 2016, St Julian's, Malta, Source: Panasonic, Title: Uplink Subframe Structure.

R1-160946, 3GPP TSG RAN WG1 Meeting #84, St Julian's, Malta, Feb. 15 - 19, 2016, Source: NTT Docomo, Inc., Title: Discussion on PUSCH design for eLAA UL.

R1-160947, 3GPP TSG RAN WG1 Meeting #84, St Julian's, Malta, Feb. 15-19, 2016, Source: NTT Docomo, Inc., Title: Discussion on UL scheduling design for eLAA.

R1-160996, 3GPP TSG RAN WG1 Meeting #84, St. Julian's, Malta, Feb. 15-19, 2016, Source: Ericsson, Title: On UL Channel Access and PUSCH Design for Enhanced LAA.

R1-161079, 3GPP TSG-RAN WG1 Meeting #84, St Julian's, Malta, Feb. 15-19, 2016, Agenda Item: 7.3.1.1, Source: InterDigital Communications, Title: On UL data transmission for eLAA.

R1-162130, 3GPP TSG RAN WG1 Meeting #84bis, Busan, Korea Apr. 11-15, 2016, Agenda Item: 7.3.1.1, Source: Huawei, HiSilicon, Title: Scheduling design for eLAA.

R1-162131, 3GPP TSG RAN WG1 Meeting #84bis, Busan, Korea, Apr. 11-15, 2016, Agenda Item: 7.3.1.1, Source: Huawei, HiSilicon, Title: Discussion on CCA gap and symbol position for PUSCH and SRS for eLAA.

R1-162259, 3GPP TSG RAN WG1 Meeting #84bis, Busan, Korea Apr. 11-15, 2016, Source: CATT, Title: PUSCH design for Rel-14 eLAA.

R1-162443, 3GPP TSG RAN WG1 Meeting #84bis, Busan, Korea Apr. 11-15, 2016, Agenda Item: 7.3.1.1, Source: NEC, Title: Discussion on LAA UL partial subframe transmission.

R1-162604, 3GPP TSG RAN WG1 Meeting #84bis, Busan, Korea Apr. 11-15, 2016, Agenda Item: 7.3.1.1, Source: Huawei, HiSilicon, Title: Design for frame structure 3 with DL and UL subframes for eLAA.

R1-162728, 3GPP TSG RAN WG1 Meeting #84bis, Busan, Korea Apr. 11-15, 2016, Agenda Item: 7.3.1.1, Source: Huawei, HiSilicon, Title: Summary on [84-14] PUSCH frame structure in eLAA.

R1-162799, 3GPP TSG RAN WG1 Meeting #84bis, Busan, Korea, Apr. 11-15, 2016, Source: NTT Docomo, Inc., Title: Discussion on PUSCH design for eLAA UL.

R1-162838, 3GPP TSG RAN WG1 Meeting #84bis, Busan, Korea, Apr. 11-15, 2016, Source: Sharp, Title: Uplink subframe structure in LAA carrier.

R1-162936, 3GPP TSG RAN WG1 Meeting #84bis, Busan, Korea, Apr. 11-15, 2016, Source: MediaTek Inc., Title: eLAA PUSCH design.

R1-163141, 3GPP TSG RAN WG1 Meeting #84bis, Busan, Korea, Apr. 11-15, 2016, Source: Ericsson, Title: On UL Subframe Structure for Enhanced LAA.

R1-163165, 3GPP TSG RAN WG1 Meeting #84bis, Busan, Korea, Apr. 11-15, 2016, Agenda Item: 7.3.1.1, Source: Xinwei, Title: Discussion on Partial Subframe Utilization for PUSCH.

R1-163207, 3GPP TSG-RAN WG1 Meeting 84bis, Apr. 11-15, 2016, Busan, Korea, Source: Panasonic, Title: Uplink Subframe Structure.

3GPP TS 36.211 V13.3.0 (Sep. 2016); Technical Specification; 3rd Generation Partnership Project; Technical Specification Group Radio Access Network; Evolved Universal Terrestrial Radio Access (E-UTRA); Physical channels and modulation (Release 13).

3GPP TS 36.212 V13.3.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 13).

3GPP TS 36.213 V13.3.0 (Sep. 2016); Technical Specification; 3rd Generation Partnership Project; Technical Specification Group Radio Access Network; Evolved Universal Terrestrial Radio Access (E-UTRA); Physical layer procedures (Release 13).

3GPP TS 36.300 V13.5.0 (Sep. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

3GPP TS 36.321 V13.2.0 (Jun. 2016); Technical Specification; 3rd Generation Partnership Project; Technical Specification Group Radio Access Network; Evolved Universal Terrestrial Radio Access (E-UTRA); Medium Access Control (MAC) protocol specification (Release 13).

3GPP TS 36.331 V13.2.0 (Jun. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 13).

IEEE 802 Interim Session; Atlanta, USA; Jan. 11-16, 2015; Title: 3GPP & unlicensed spectrum.

RP-151725; 3GPP TSG RAN Meeting #70, Sitges, Spain, Dec. 7-10, 2015; Source: ZTE, Xinwei; Title: Supporting dual connectivity in LAA.

Rp-151978, 3GPP TSG RAN Meeting #70; Sitges, Spain, Dec. 7-10, 2015; revision of RP-yynnnn, Source: Ericsson, Huawei, Title: New Work Item on enhanced LAA for LTE.

RP-151979; 3GPP TSG RAN Meeting #70; Sitges, Spain, Dec. 7-10, 2015; Agenda item 14.1.1; Motivation For Enhanced Licensed Assisted Access Form LTE In Rel-14.

RP-160926; 3GPP TSG RAN Meeting #72; Busan, Korea, Jun. 13-17, 2016; Source: ZTE; Title: Discussion on further enhancement of LAA for LTE.

RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell.

RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum.

RP-161701; 3GPP TSG RAN Meeting #73; New Orleans, Sep. 19-22, 2016; Source: ZTE; Title: New WI proposal Further enhancement on FeLAA.

(56)                References Cited

OTHER PUBLICATIONS

RP-161702; 3GPP TSG RAN Meeting #73; New Orleans, USA, Sep. 19-22, 2016; Motivation for New WI Further Enhancement on FeLAA.

Jan. 24, 2017—International Search Report and Written Opinion—PCT/US2016/057420.

Vu, Long Hoang et al., "Multi-Carrier listen Before Talk Mechanism for LTE in Unlicensed Spectrum," 2016 Annual Conference of the Korean Institute of Communication Sciences, 2016, pp. 388-389.

R1-153228, 3GPP TSG RAN WG1 Meeting #81, Fukuoka, Japan, May 25-29, 2015, Source: Huawei, HiSilicon, Title: UL transmission design for LAA.

R1-153135, 3GPP TSG RAN WG1 Meeting #81, Fukuoka, Japan, May 25-29, 2015, Source: Ericsson, Title: On Scheduling in LAA with Downlink and Uplink Transmissions.

Jul. 12, 2018—Korean Office Action—KR 2018-7010708.

3GPP TSG RAN WG1 Meeting #71 R1-124676 New Orleans, USA, Nov. 12-16, 2012 Final Report of 3GPP TSG RAN WG1 #70.

Jul. 23, 2018—Japanese Office Action—JP 2018-512586.

Aug. 30, 2019—Japanese Office Action—JP 2018-247389.

R1-164598 3GPP TSG RAN WG1 Meeting #85, Nanjing, China, May 23-27, 2016, Source: ZTE, Title: Discussion on UCI transmission on an LAA SCell.

R1-162669 3GPP TSG RAN WG1 Meeting #84bis, Busan, Korea, Apr. 11-15, 2016, Source: Samsung, Title: Discussion on enhanced random access procedure for UL LAA.

R1-164573 3GPP TSG RAN WG1 Meeting #85, Nanjing, China, May 23-27, 2016, Source: ZTE, Title: Consideration of LBT failure in LAA UL HARQ operation.

* cited by examiner

FIG. 5A Example uplink physical channel

FIG. 5B Example uplink modulation

FIG. 5C Example downlink physical channel

FIG. 5D Example downlink modulation

Dual-Connectivity at eNB

Dual-Connectivity- two MAC entities at UE side

CELL ACTIVATION AND DEACTIVATION IN A WIRELESS NETWORK

CROSS-REFERENCE TO RELATED APPLICATIONS

This application is a continuation of and claims priority to U.S. patent application Ser. No. 17/973,222, filed Oct. 25, 2022, which is a continuation of U.S. patent application Ser. No. 16/922,757, filed Jul. 7, 2020 (now U.S. Pat. No. 11,523,379), which is a continuation of U.S. patent application Ser. No. 16/184,742, filed Nov. 8, 2018 (now U.S. Pat. No. 10,708,901), which is a continuation of U.S. patent application Ser. No. 15/273,341, filed Sep. 22, 2016 (now U.S. Pat. No. 10,172,124), which claims the benefit of U.S. Provisional Application No. 62/221,701, filed Sep. 22, 2015.

This application is also a continuation is a continuation of and claims priority to U.S. patent application Ser. No. 17/973,254, filed Oct. 25, 2022, which is a continuation of U.S. patent application Ser. No. 16/922,847 filed on Jul. 7, 2020 (now U.S. Pat. No. 11,516,792), which is a continuation of U.S. patent application Ser. No. 16/184,742, filed Nov. 8, 2018 (now U.S. Pat. No. 10,708,901), which is a continuation of U.S. patent application Ser. No. 15/273,341, filed Sep. 22, 2016 (now U.S. Pat. No. 10,172,124), which claims the benefit of U.S. Provisional Application No. 62/221,701, filed Sep. 22, 2015.

Each of the above-referenced applications is hereby incorporated by reference in its entirety.

BRIEF DESCRIPTION OF THE SEVERAL VIEWS OF THE DRAWINGS

Examples of several of the various embodiments of the present invention are described herein with reference to the drawings.

DETAILED DESCRIPTION OF EMBODIMENTS

Figure 1:
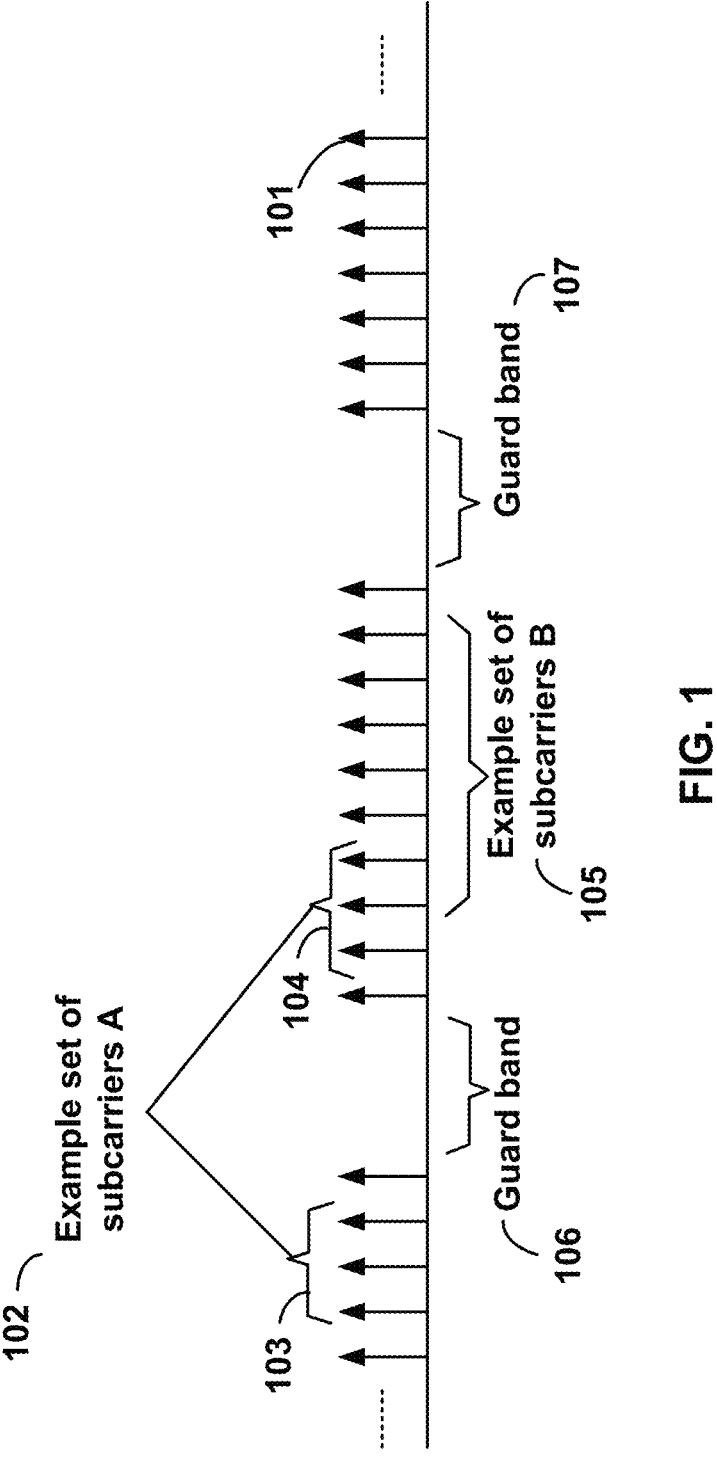
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media/medium access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scells secondary cells
SCG secondary cell group
SeNB secondary evolved node B
STAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access

3

TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
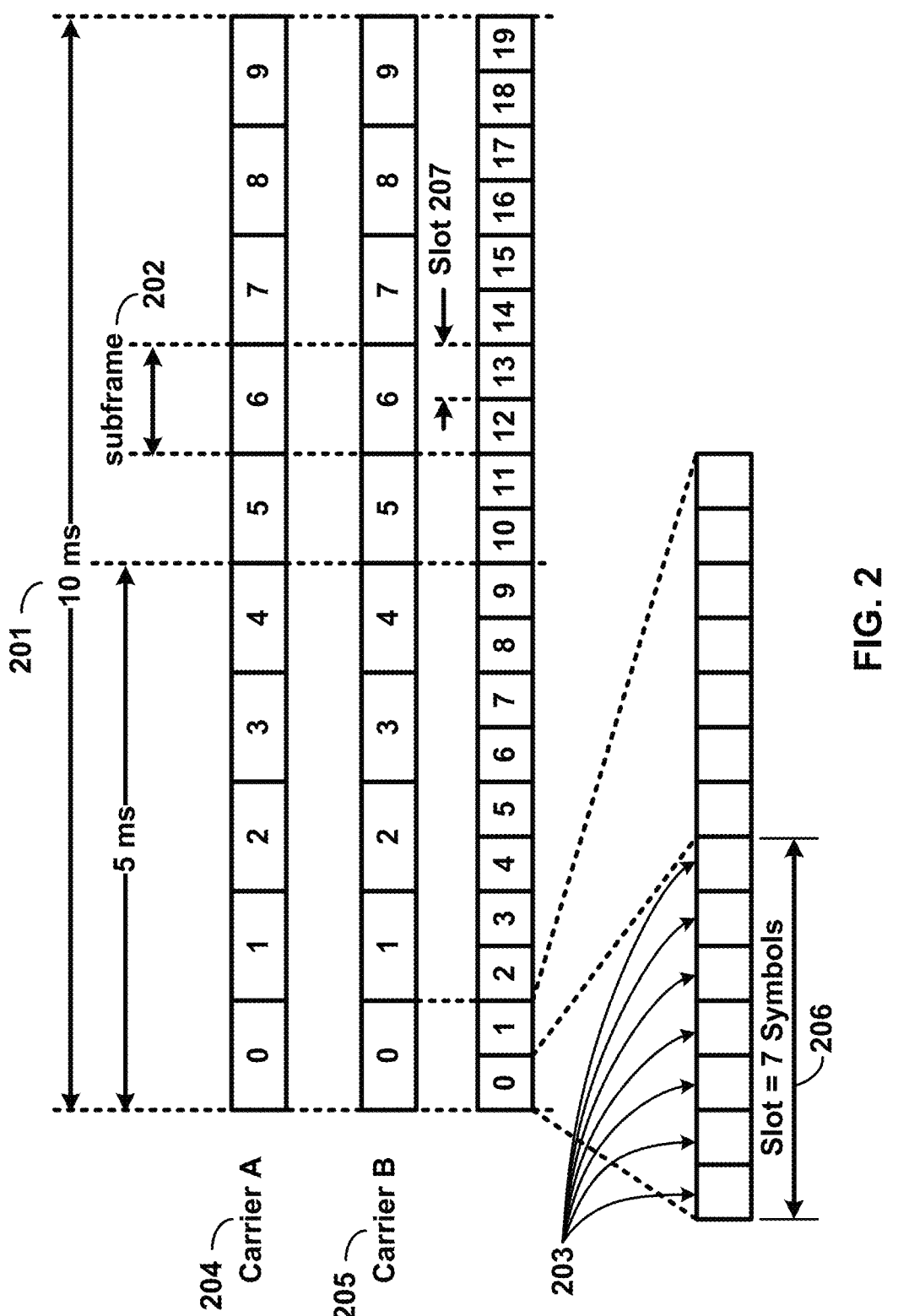
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
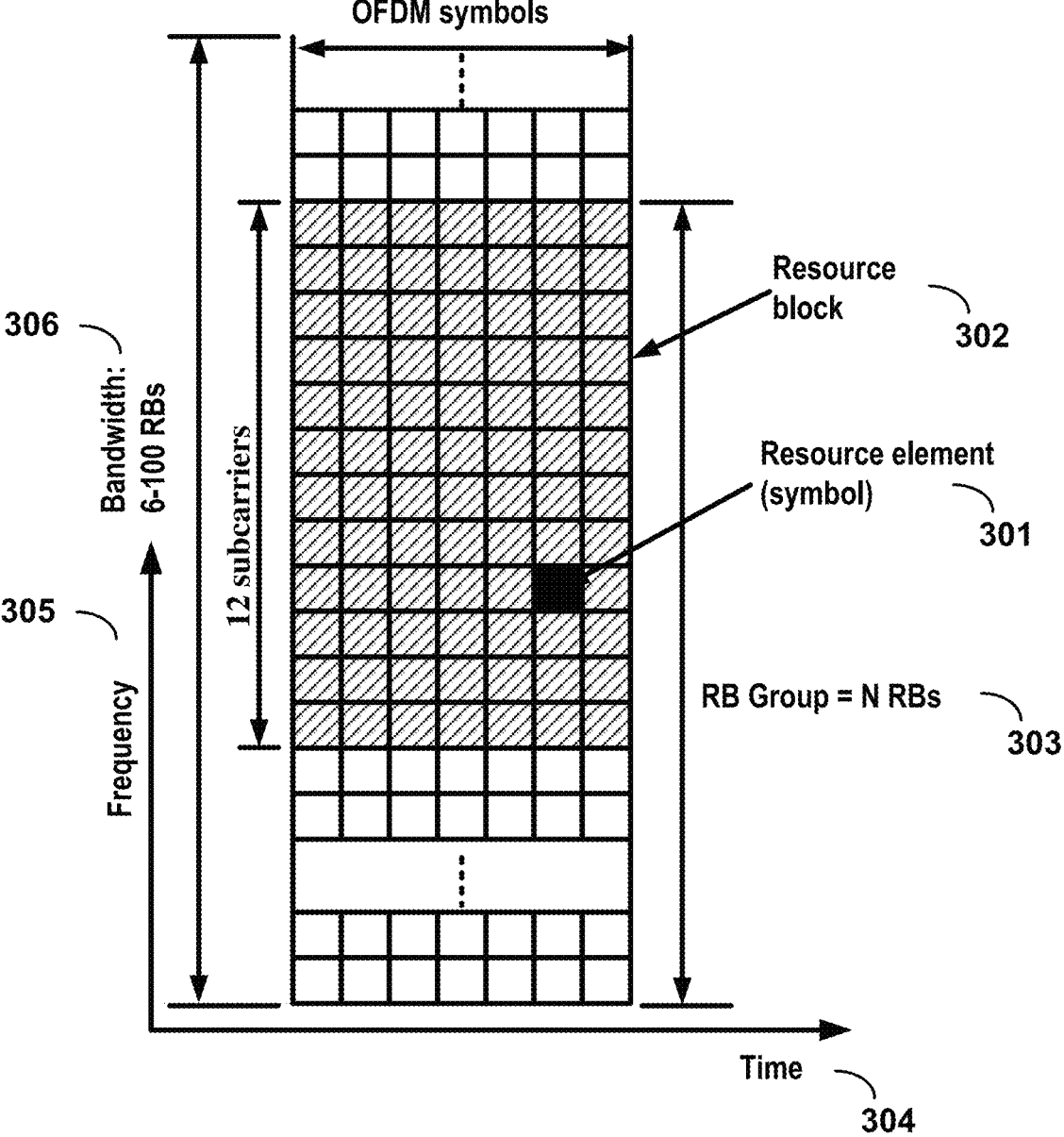
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

Figure 5:
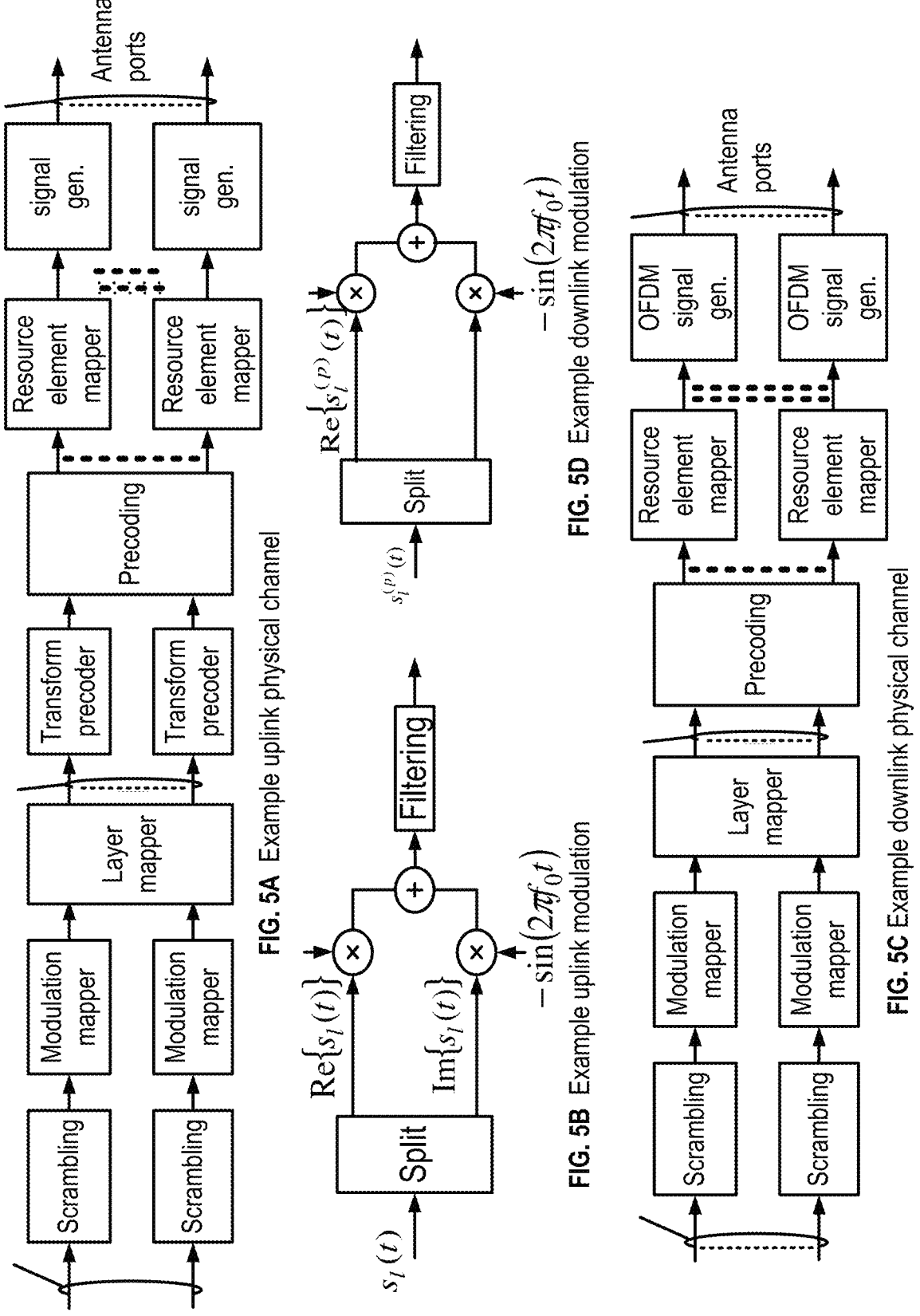
FIG. 5A, FIG. 5B, FIG. 5C and FIG. 5D are example diagrams for uplink and downlink signal transmission as per an aspect of an embodiment of the present invention.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
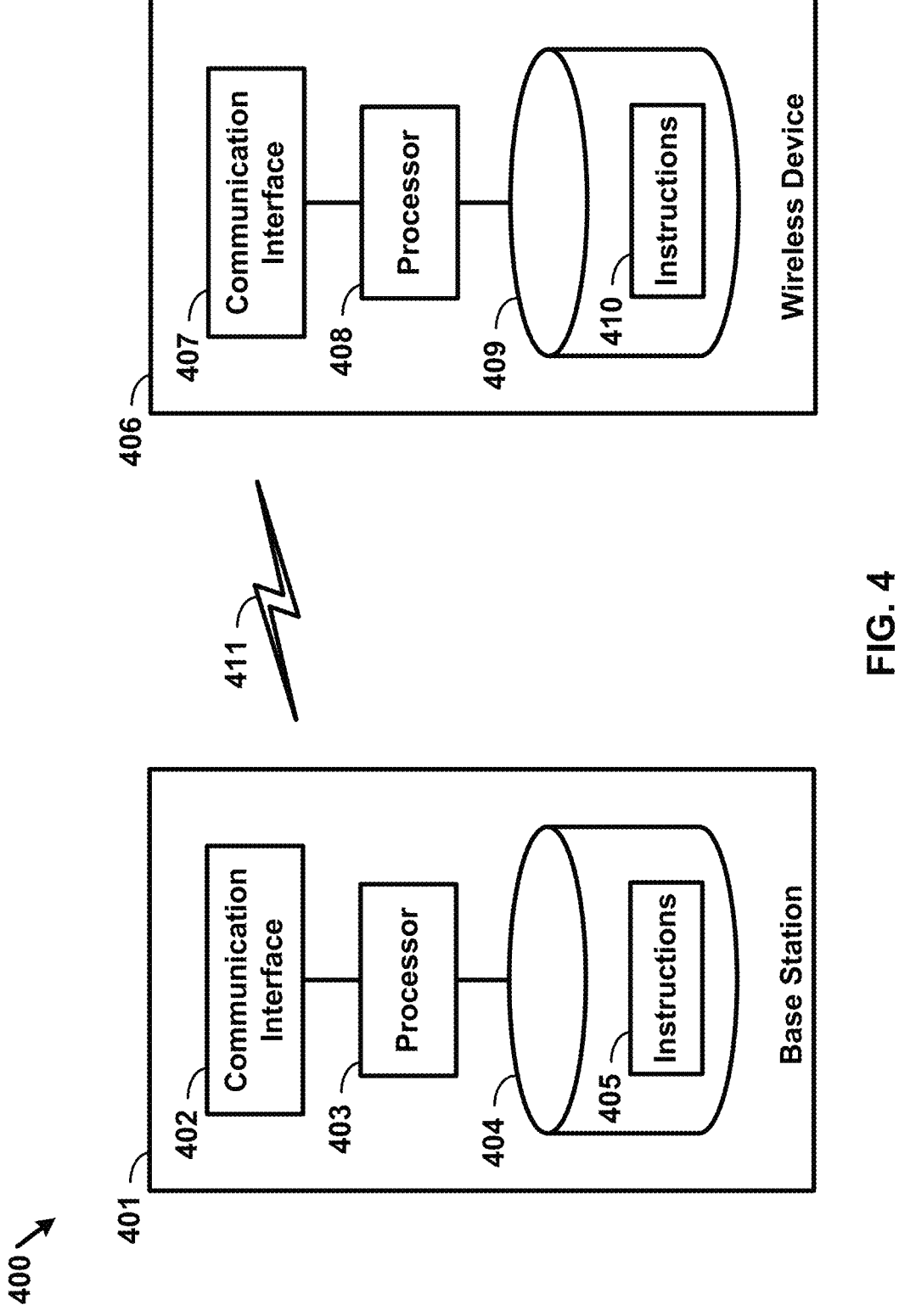
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability (ies) depending on its wireless device category and/or capability (ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
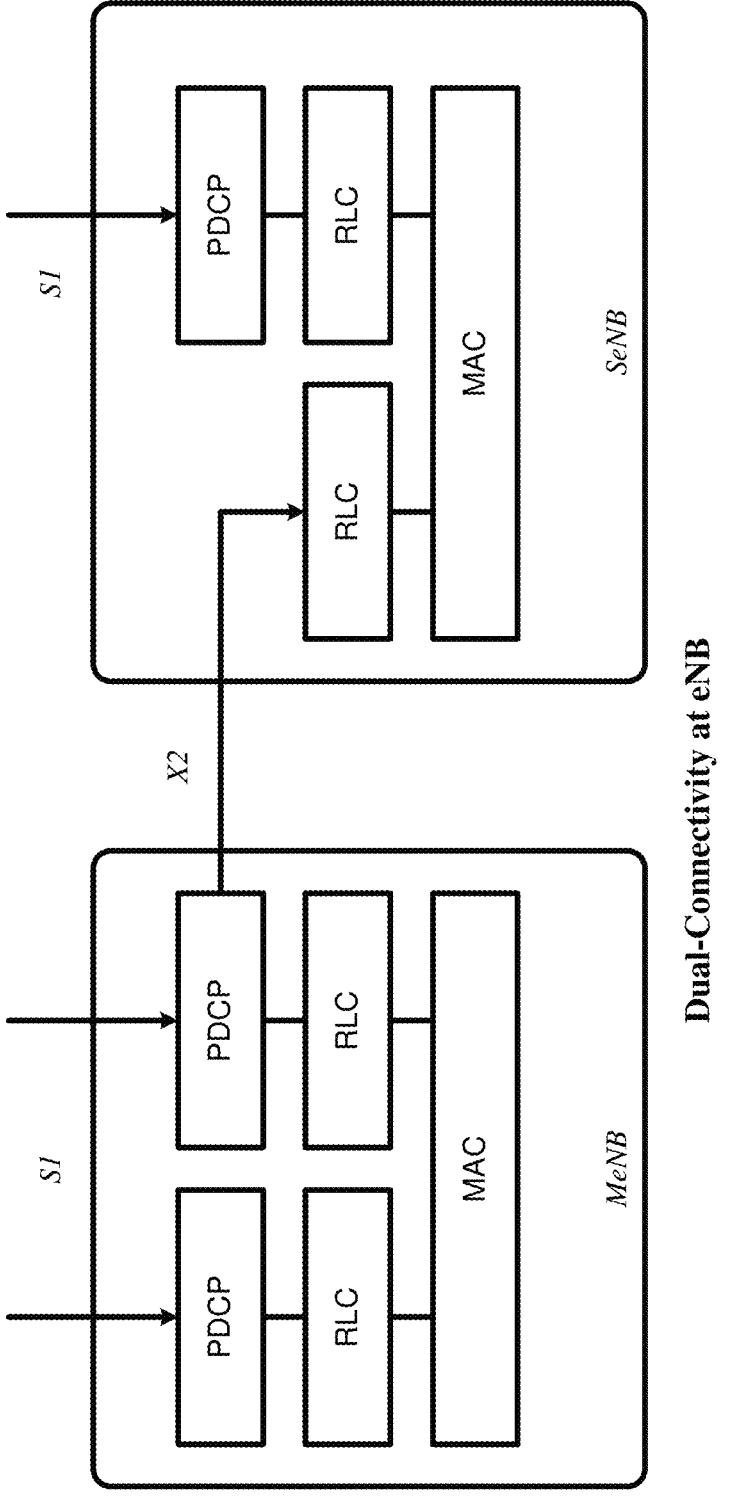
FIG. 6 is an example diagram for a protocol structure with CA and DC as per an aspect of an embodiment of the present invention.
Figure 7:
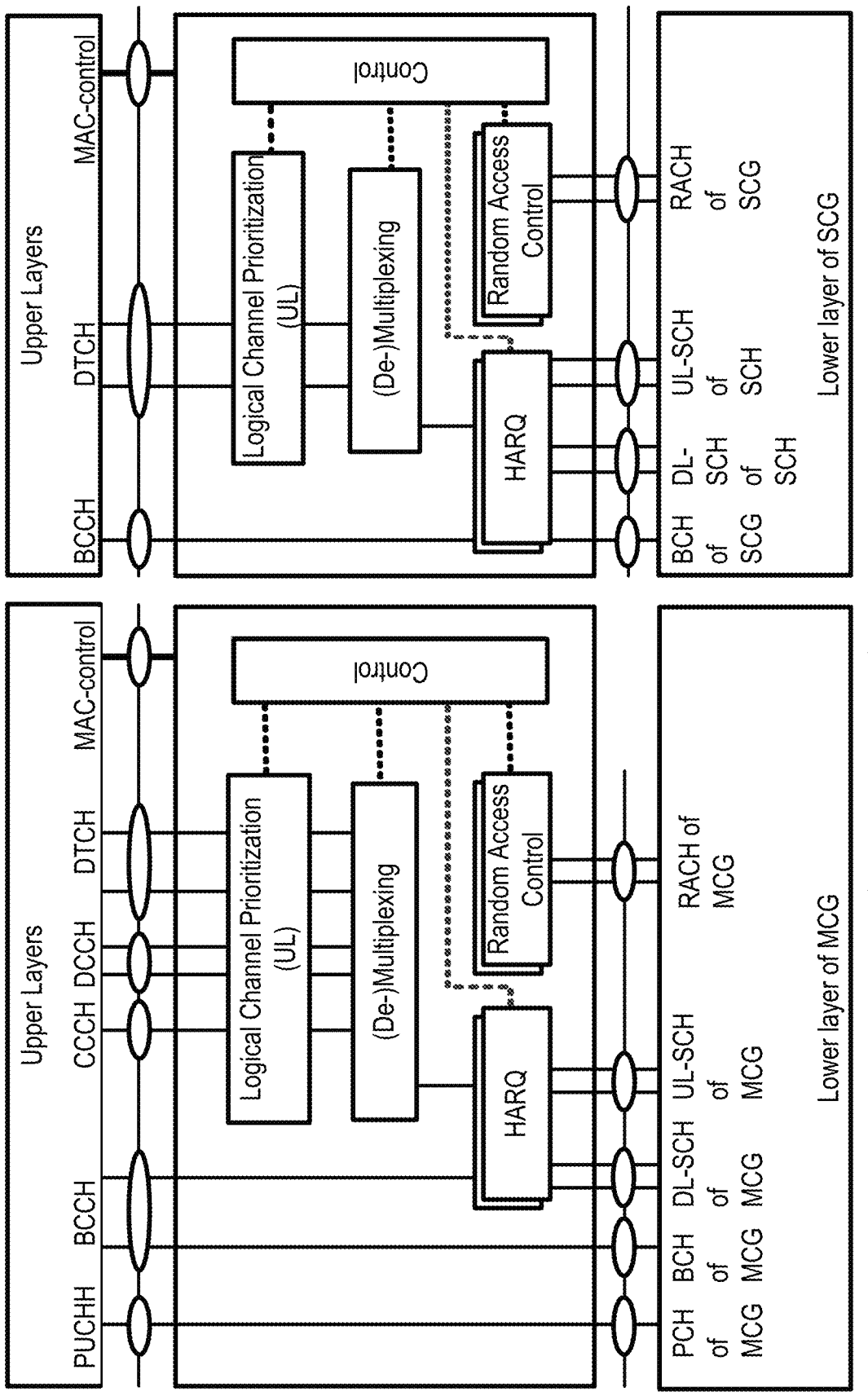
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for ScNB. In DC, the configured set of serving cells for a UE may comprise of two subsets: the Master Cell Group (MCG) containing the serving cells of the MeNB, and the Secondary Cell Group (SCG) containing the serving cells of the ScNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the ScNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
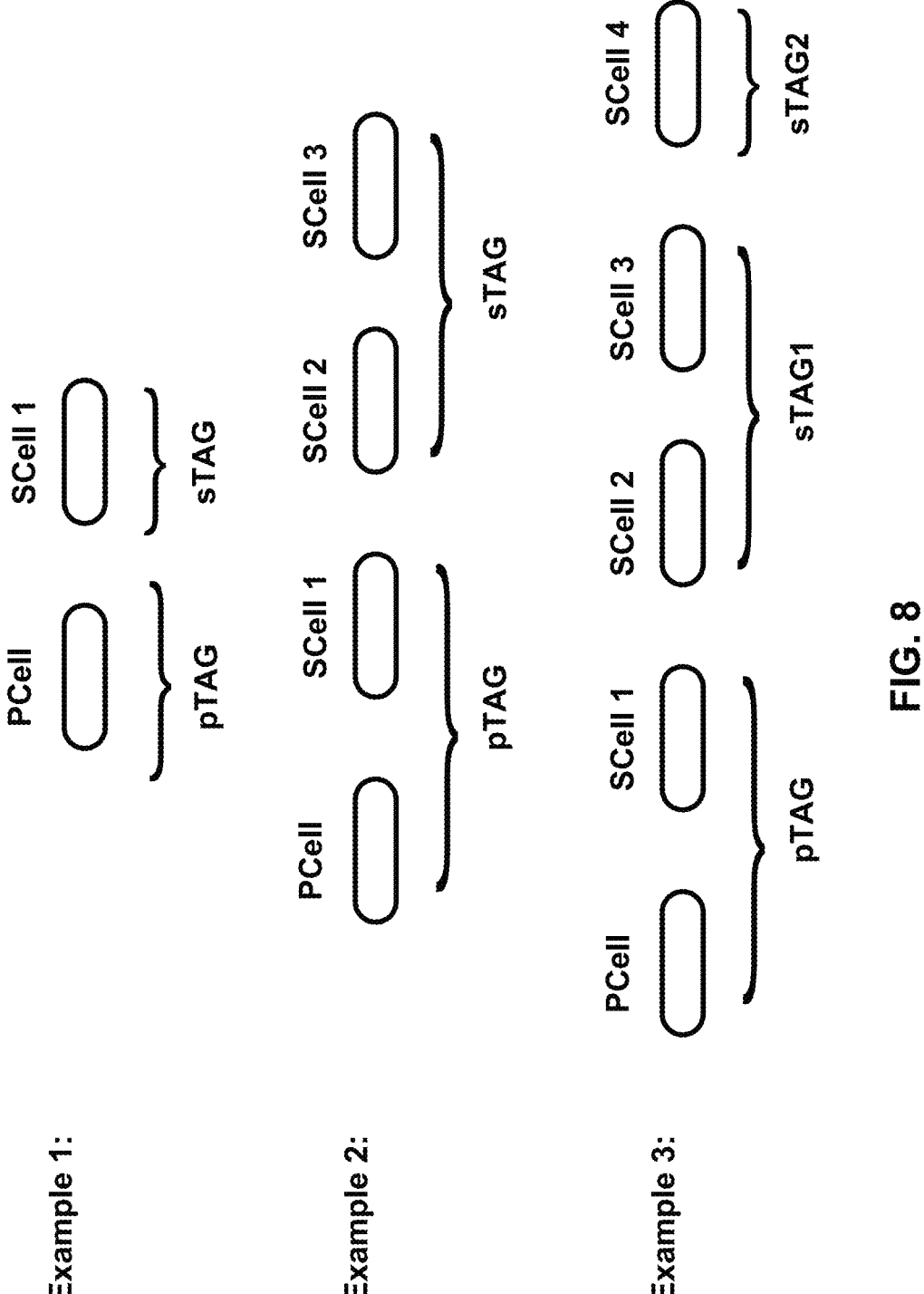
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
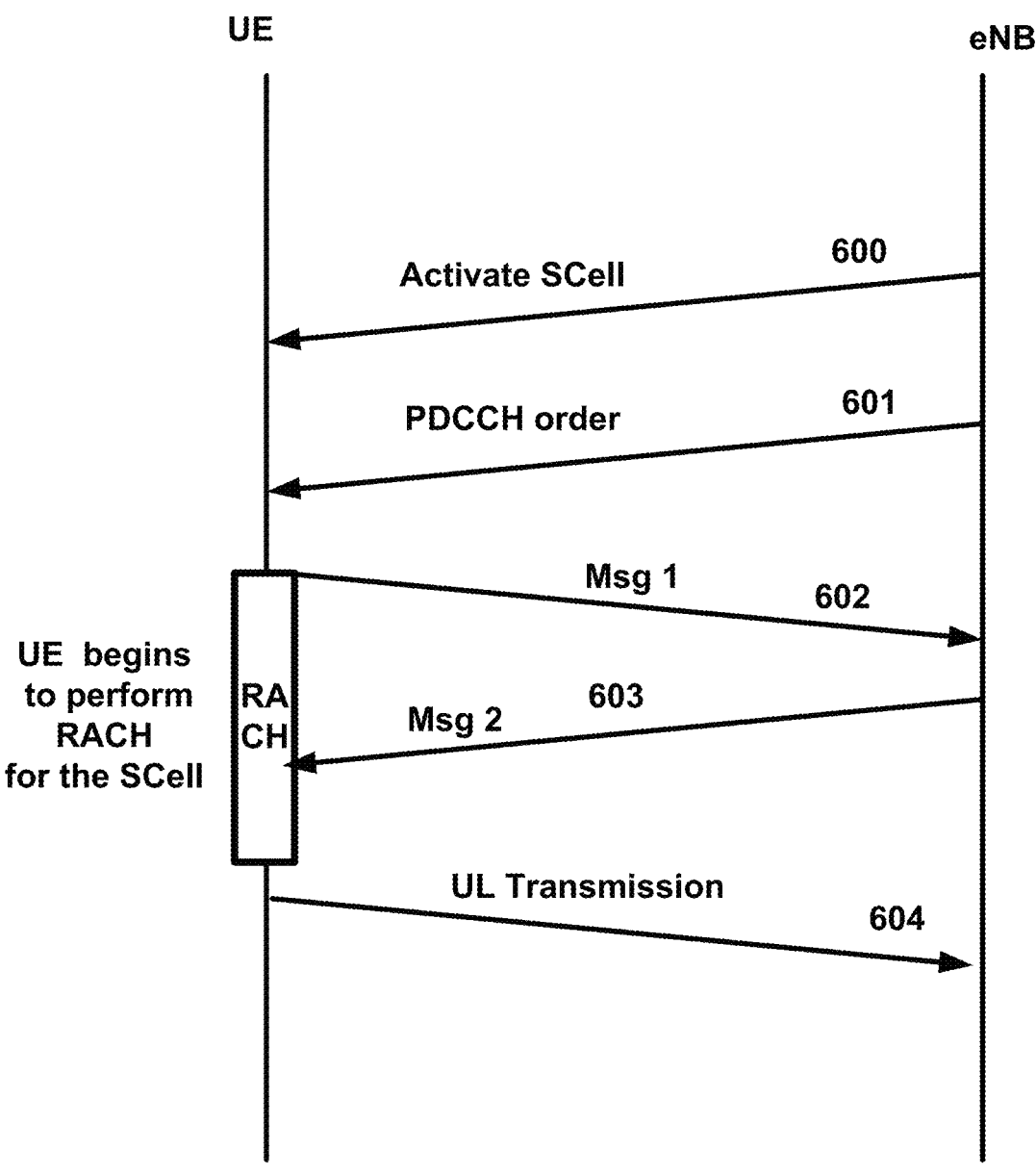
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order

601 on an SCell belonging to an sTAG. In an example embodiment, preamble transmission for SCells may be controlled by the network using PDCCH format IA. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The CNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The CNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The time-AlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g., wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

The following signals or combination of the following signals may provide functionality for the UE's time/frequency synchronization for the reception of a DL transmission burst in LAA SCell(s): a) serving cell's DRS for RRM measurement (DRS for RRM measurement may be used at least for coarse time/frequency synchronization), b) reference signals embedded within DL transmission bursts (e.g. CRS and/or DMRS), and/or c) primary/secondary synchronization signals. If there is an additional reference signal, this signal may be used. Reference signals may be used at least for fine time/frequency synchronization. Other candidates (e.g., initial signal, DRS) may be employed for synchronization.

DRS for RRM may also support functionality for demodulation of potential broadcast data multiplexed with DRS transmission. Other mechanism or signals (e.g., initial signal, DRS) for time/frequency synchronization may be needed to support reception of DL transmission burst.

In an example embodiment, DRS may be used at least for coarse time/frequency synchronization. Reference signals (e.g., CRS and/or DMRS) within DL transmission bursts may be used at least for fine time/frequency synchronization. Once the UE detects DRS and achieves coarse time/frequency synchronization based on that, UE may keep tracking on the synchronization using reference signals embedded in other DL TX bursts and may also use DRS. In an example, a UE may utilize DRS and/or reference signals embedded within DL transmission burst targeting the UE. In another example, a UE may utilize DRS and/or reference signals embedded within many available DL transmission bursts from the serving cell (to the UE and other UEs).

The discovery signal used for cell discovery/RRM measurement (e.g. opportunistic transmission within configured DMTC) may be used for maintaining at least coarse synchronization with the LAA cell (e.g. <±3 μs timing synchronization error and <±0.1 ppm frequency synchronization error). DRS may be subject to LBT. Inter-DRS latency generally gets worse as Wi-Fi traffic load increases. It is noted that the inter-DRS latency can be rather significant. In example scenario, there may be 55% probability that the inter-DRS latency is 40 ms and there is 5% probability that inter-DRS latency is ≥440 ms. The inter-DRS latency as seen by the UE may be worse considering the possibility of misdetection by the UE. Discovery signal misdetection may be due to actual misdetection or due to UE unavailable for detection because of DRX inter-frequency measurement during DMTC occasion.

Depending on LAA DRS design, OFDM symbol boundary may be obtained by DRS. PCell and SCell timing difference may be kept, +30 usec order. The aggregated cells may be synchronized to some extent, e.g. aligned frame timing and SFN. Thus, similar requirement may be applied to the PCell and LAA cells on the unlicensed band. In an example, a UE may not utilize timing and frequency of the PCell for coarse synchronization of LAA cells since the timing offset may be up to ~30 us (e.g. non-located) and frequency reference may not be reliable due to the band distance between PCell and LAA cell (2 GHz PCell and 5 GHZ LAA cell). PCell timing information also may be used for time synchronization at subframe or frame level. SCell(s) may employ the same frame number and subframe number as the PCell.

PCell timing information may provide some information for symbol synchronization. By synchronizing PCell, frequency difference observed by UE between PCell and LAA SCell may be up to 0.6 ppm. For example, after 300 ms, the amount of the time drift may be 0.18 usec at most. For LAA, path delay may be relatively small as the target coverage is small. With timing drift, the multi-path delay may be within cyclic prefix length.

According to some of the various aspects of embodiments, a UE may utilize a licensed band carrier as a reference for time/frequency synchronization for CA of licensed carrier and unlicensed carrier, for example when they are in the same group (e.g. co-located). When non-collocated eNBs support licensed band PCell and unlicensed band SCell separately in a CA scenario, there may exist maximum ~30 us timing difference between PCell and unlicensed band SCell. In an example embodiment, the frequency difference between the UE synchronized with PCell and unlicensed band SCell may observe at most 0.6 ppm. An LAA may provide functionality for time/frequency synchronization on unlicensed band at least for non-collocated CA scenario.

Example reasons of frequency difference may be 1) oscillator difference among PCell, SCell and UE, 2) Doppler shift and 3) fast fading aspect. The oscillator difference of 0.6 ppm offset in 5 GHz corresponds to 3 kHz offset. Subcarrier spacing of LTE numerology is 15 kHz. This offset may need to be taken into account before FFT operation. One of the reasons of oscillator frequency variation is the temperature. If the frequency difference is not obtained at the point of DRS reception, UE may need to buffer subsequent data transmission until UE obtains this frequency difference before FFT. The frequency offset caused by this may be obtained at the reception of DRS. Doppler shift may be small value for a low mobility UE. Fast fading and residual mismatch caused by 1) and 2) may be compensated during demodulation process similar to a licensed band. This may not require introducing additional reference signals for unlicensed band.

According to some of the various aspects of embodiments, a UE may be configured to perform inter-frequency measurements on the carrier frequency layer using measurement gaps for SCells that are not configured yet. SCell receiver may not be turned on and measurements may be performed using the PCell receiver. When a cell is added as SCell but not activated ("deactivated state"), the UE may receive relevant system information for the SCell from the PCell. UE may be configured to perform measurements on the SCell without measurement gaps. SCell receiver may need to be occasionally turned on (e.g. for 5 ms every 160 ms) for RRM measurements using either CRS or Discovery signals. Cells may be added as SCell and activated ("activated state"), then the UE may be ready to receive PDSCH on the SCell in all subframes. The SCell receiver may perform (E) PDCCH monitoring in every subframe (for self scheduling case). SCell receiver may buffer every subframe for potential PDSCH processing (for both self and cross-carrier scheduling cases).

The eNodeB may configure the UE to measure and report RRM measurements (e.g. including RSSI) on a set of carrier frequencies. Once a suitable carrier or a set of suitable carriers is determined, carrier selected may be added as an SCell by RRC (e.g. with ~15 ms configuration delay), followed by SCell activation (with ~24 ms delay). If an SCell is deactivated, the UE may assume that no signal is transmitted by the LAA cell, except discovery signal may be transmitted when configured. If an SCell is activated, the UE is required to monitor PDCCH/EPDCCH and perform CSI measurement/reporting for the activated SCell. In a U-cell, a UE may not assume that every subframe of activated LAA SCell contains transmission. For LAA carriers, channel access may depend on the LBT procedure outcome. The network may configure and activate many carriers for the UE. The scheduler may then dynamically select carrier(s) for DL assignment or UL grant transmission.

According to some of the various aspects of embodiments, the first stage of cell level carrier selection may be during initial set up of a cell by an eNB. The CNB may scan and sense channels for interference or radar detection. eNB may configure the SCells accordingly based on the outcome of its carrier selection algorithm for efficient load balancing and interference management. The carrier selection process may be on a different time scale from the LBT/CCA procedure prior to transmissions on the carriers in unlicensed spectrum. The RSSI measurement report from UE may be used to assist the selection at cNB.

According to some of the various aspects of embodiments, the second stage of cell level carrier selection is after initial set up. The motivation is that eNB may need to do carrier (re) selection due to static load and interference change on some carriers, e.g., a new Wi-Fi AP is set up and continuously accesses the carrier causing relatively static interference. Therefore, semi-static carrier selection may be based on the eNB sensing of the averaged interference level, potential presence of radar signals if required, and traffic load on the carriers over a relatively longer time scale, as well as RRM measurement from UEs in the cell. Due to the characteristics in unlicensed spectrum, RRM measurements on LAA SCells may be enhanced to support better carrier selection. For example, the RSSI measurement may be enhanced using occupancy metric indicating the percentage of the time when RSSI is above a certain threshold. It may be noted that cell level carrier selection may be a long-term (re) selection since the process may be rather costly due to the signalling overhead and communication interruptions for UEs in a cell and it may also affect the neighboring cells. Once a suitable set of carriers is identified, they may be configured and activated as SCells for UEs. This process may be continuous in order to keep reassessing the interference environment. Cell-level carrier selection in unlicensed spectrum may be a relatively long-term (re) selection based on eNB sensing and RRM measurement report from UE. RRM measurement on LAA SCells may be enhanced to support better carrier selection.

Carrier selection from UE perspective may be to support carrier selection for a UE among the set of carriers that the eNB has selected at the cell level. Carrier selection for the UE in unlicensed spectrum may be achieved by configuring a set of the carriers on which the UE supports simultaneous reception and transmission. The UE may perform RRM measurements on the configured carriers and report them to the eNB. The CNB may then choose which of the carriers to activate and use for transmission when it has pending data for the UE. The number of carriers to activate may then also be chosen based on the data rate needed and the RRM measurements for the different carriers. The activation delay for a carrier before scheduling data on it may be up to ~24 ms, assuming that the UE has performed RRM measurement on this carrier prior to receiving the activation command within DRX cycle. By operating the carrier selection based on activation and deactivation, the selection may also be done in the order of tens of ms.

According to some of the various aspects of embodiments, CRS may not be transmitted in an activated subframe when a burst is not scheduled in that subframe. If there are no transmissions from the eNB for an extended duration (Toff), UE demodulation performance may be impacted due to lack of reference symbols for fine time/frequency tracking. The extent of performance impact depends on the amount of time for which there are no eNB transmissions. The impact may be mitigated by more frequent transmission of discovery signals.

Discovery signals may be transmitted by the eNB even when UEs are not being scheduled. Setting discovery signal periodicity based on UE RRM measurement requirements (e.g. 160 ms) may be more efficient than setting the periodicity based on UE fine time/frequency tracking requirement.

In an example embodiment, SCell deactivation timer for the unlicensed SCell may be set to a value closer to (Toff) based on UE fine time/frequency tracking requirements. This may result in more frequent transmission of activation commands. Activation commands may be needed when the eNB has data to schedule to a UE. From the UE perspective, after receiving an activation command in a particular subframe, the UE may receive CRS in a number (e.g. one or two) of following subframes. The UEs may receive CRS transmissions for a few symbols or subframes, which they may use for settling AGC loop and time-frequency tracking filters before PDSCH reception on the SCell. UEs may receive CRS transmission (e.g. in a few OFDM symbols) between reception of activation command and reception PDSCH on the SCell.

Activating a large number of carriers on dynamic bases may increase the UE power consumption, false alarm probability, and processing power requirements. Improved mechanisms are needed to improve efficiency in the UE and enable fast and dynamic carrier selection/activation in a UE. Novel mechanisms may reduce UE power consumption, reduce false alarm probability and reduce processing power requirements. Carrier selection and activation may be enhanced to achieve fast dynamic carrier selection (or switching). A fast activation procedure for the carrier (e.g. shorter than the currently defined 24 ms) may be defined to improve efficiency.

Current SCell activation latency may include the MAC CE decoding latency (~3-6 ms) and SCell activation preparation time (RF preparation, up to ~18 ms). Implementation of faster processes and hardware may reduce these delays. SCell MAC activation/deactivation signalling is UE-specific. Signalling overhead may be a concern especially if the cell used for transmitting the signal is a macro cell. In an example embodiment, a L1 procedure/indicator may be introduced and/or SCell activation signalling may be enhanced.

Layer one signalling (e.g. PDCCH/EPDCCH from the PCell or another serving cell) may be implemented to signal the set of carriers that the UE may monitor for PDCCH/EPDCCH and/or measuring/reporting CSI. Control signalling latency may be ~2 ms (e.g. one 1 ms EPDCCH transmission plus 0.5 ms decoding). The DCI format may be of small size for transmission reliability and overhead reduction. To reduce control signalling overhead, the signalling may be a UE-common signalling. The indication may be sent on a carrier that the UE is currently monitoring.

In an example embodiment, a mechanism based on a L1 indication for starting/stopping monitoring of up to k activated carriers may be provided. The UE may be configured with n>=k CCs. k CCs may be activated via MAC signalling of SCell activation/deactivation. Then based on LBT progress over the CCs, a L1 indication is sent to inform which of the k CCs may be monitored by the UE and which may not. The UE may then receive data burst(s) on the monitored CCs. Another L1 indication may be sent after the bursts to alter which CCs may be monitored since then, and so on. The L1 indication may be explicit (e.g., based on a signalling) or implicit (e.g., based on self scheduling and UE detection of scheduling information on the SCell). For this example, fast carrier switching is done among at most k CCs.

In an example embodiment, a mechanism based on a L1 signalling for starting/stopping monitoring of up to m activated carriers (the number of p configured carriers may be m or higher). The activated carriers may be more than n (e.g., there may be more CCs activated for the UE than its PDSCH aggregation capability-n). The UE is configured with p CCs, and there may be up to m CCs that are activated via MAC signalling of SCell activation/deactivation. The UE may not monitor all the activated CCs. The UE may monitor at most n CCs according a L1 indication. The L1 indication needs to be explicit rather than implicit, since an implicit indication may require a UE to monitor all the up to m activated carriers at the same time, exceeding the UE's capability. For this example, fast carrier switching is done among possibly more than n CCs.

According to some of the various aspects of embodiments, SCell activation/deactivation enhancements may be considered for fast carrier switching. SCell activation/deactivation signalling is a MAC signalling. MAC signalling decoding/detection (with or without enhancements) may be slower than L1 signalling decoding/detection. It may involve decoding/detection of a L1 signalling and furthermore, a PDSCH. If SCell activation/deactivation is carried by a L1 signalling, it may still be considered for fast carrier switching. In an example embodiment, a mechanism based on a L1 signalling for activation/deactivation of the p configured carriers. The UE is configured with p CCs, but each time there are at most n CCs are activated via a L1 signalling of SCell activation/deactivation. For instance, based on LBT progress over the CCs, a L1 signalling is sent to inform which of the p CCs are activated. The UE may receive data burst(s) on the activated CCs. Another L1 signalling may be sent after the bursts to alter the activated CCs. For this example, fast carrier switching is done among possibly more than n CCs.

The control signalling may be transmitted before the eNB has gained access to the carrier via LBT process. An eNB may inform the UE to start (or stop) monitoring a carrier (whether the UE would receive a burst or not depends on the presence of PDCCH scheduling information for the carrier). An indication for starting monitoring may be used for more than one burst, until an indication for stopping monitoring is sent. The indication may be sent when the eNB expects the (E)CCA is to complete soon. A purpose of the indication may be to inform a UE to start or stop monitoring a carrier.

Transmitting the control signalling after the eNB has gained access to the carrier may incur overhead of the reservation signal (proportional to the control signalling latency). In an example, the maximum transmission burst may be 4 ms. An eNB may inform the UE to receive a burst on a carrier. The CNB may send one indication for a burst. There may be many short bursts (e.g., one burst may last up to 4 milliseconds in certain regions). The indication may be sent after (E)CCA is completed, consuming some portion of the maximum allowed transmission duration for a burst.

It may still be up to the network to transmit the control signalling before or after the channel is occupied. A UE may detect that the burst is from the serving cell (e.g. by confirming PCID). The function of the control signalling is to indicate that the UE may perform DL transmission burst detection of the serving cell. If a DL burst of the serving cell is detected, UE may monitor for possible PDCCH/EPDCCH and/or measuring the CSI on the indicated SCell.

In an example embodiment, a UE may be configured with a number of carriers potentially exceeding the maximum number of carriers over which the UE may aggregate PDSCH. RRM measurements over the configured carriers may be supported, e.g. RSSI-like measurement, extension of quasi co-location concept to across collocated intra-band carriers, and/or carrier grouping. L1 indication to the UE to start monitoring a carrier, which is selected from the configured carriers by the CNB may be supported.

According to some of the various aspects of embodiments, an eNB may configure UE with more component carriers which may potentially exceed the maximum number of carriers over which the UE may aggregate PDSCH. Then eNB may activate one or more carriers among the configured carriers to UE by the existing signalling, e.g. MAC signalling. UE may be scheduled on the one or more activated carriers dynamically based on the LBT mechanism.

A UE may switch to receive on any carrier within a set of carriers selected by the serving eNB as fast as subframe/symbol-level, while the number of carriers within the set may potentially exceed the maximum number of carriers over which the UE may aggregate PDSCH. Which carrier(s) the UE may switch to is per eNB indication. When the UE is indicated with the carrier(s) it may switch to, the UE may start to monitor the indicated carrier(s), e.g. within a few subframes, and may stop monitoring other carriers. By monitoring a carrier it meant to buffer and attempt to detect the control channels and other associated channels. The CNB indication may instruct the UE to switch to the indicated carrier(s) and monitor the carrier(s). The eNB may not instruct the UE to switch to monitor on more carriers than its PDSCH aggregation capability in a given subframe. The eNB may not schedule the UE on more carriers than its PDSCH aggregation capability. SCell configuration enhancements may allow both semi-static and fast carrier switching with reduced transition time. The delay associated with the SCell configuration signalling as well as the delay associated with the measurement process may be decreased.

In an example embodiment, fast carrier switching may support UE to switch to any carrier within a set of carriers selected by the serving eNB as fast as a few subframes/symbols. The eNB may send an indication instructing the UE to switch to the indicated carriers and monitor the carriers. Then the UE may perform the switching and start monitoring the indicated carriers. The UE stops monitoring other carriers. The CNB indication may be done in L1. A L1 procedure/indicator, or an enhancement of the SCell activation signalling may be introduced.

According to some of the various aspects of embodiments, DRS design may allow DRS transmission on an LAA SCell to be subject to LBT. The transmission of DRS within a DMTC window if LBT is applied to DRS may consider many factors. Subjected to LBT, DRS may be transmitted in fixed time position within the configured DMTC. Subject to LBT, DRS may be transmitted in at least one of different time positions within the configured DMTC. The number of different time positions may be restricted. One possibility is one time position in the subframe. DRS transmissions outside of the configured DMTC may be supported.

According to some of the various aspects of embodiments, an sensing interval may allow the start of a DL transmission burst (which may not start with the DRS) containing DRS without PDSCH within the DMTC. Total sensing period may be greater than one sensing interval. Whether the above may be used for the case where transmission burst may not contain PDSCH but contains DRS, and any other reference signals or channels. The ECCA counter used for LBT category 4 for the PDSCH may be frozen during DL transmission burst containing DRS without PDSCH The RS bandwidth and density/pattern of the DRS design for LAA may support for RRM measurement based on a single DRS occasion.

According to some of the various aspects of embodiments, Discovery signal may be transmitted via a successful LBT operation. When the eNB does not have access to the channel, the discovery signal burst may not be transmitted. In an example, the discovery signal periodicity is configured to be 40 ms, and it may be possible to receive the discovery signal at least once in every 160 to 200 ms with a high probability. For example, the probability of receiving a discovery signal burst at least once in every 160 ms may greater than 97%. The UE may adjust its receiver processing to account for the potential absence of discovery signals due to lack of access to the channel. For instance, the UE may detect the presence or absence of a particular discovery signal burst using the PSS, SSS and CRS signals.

According to some of the various aspects of embodiments, the use of discovery signals that may be subject to LBT. A discovery signal burst may not be transmitted when LBT fails. Data may be transmitted in the intervening subframes. The reference signals along with control information may be used to reserve the channel prior to a discovery signal or data transmission.

For reception of data on the serving cell, AGC and fine time and frequency estimation may employ the discovery signals from the serving cell. In an example, time and frequency estimation may be performed using the PSS, SSS and/or CRS inside the discovery signal subframes. The use of two or more CRS ports may enhance synchronization performance. These signals may provide synchronization estimates that are adequate for the purpose of RRM measurements on the serving and neighboring cells. When data is to be received by the UE in a subframe that occurs a significant number of subframes after the last reception of a discovery signal on the serving cell. Fine tuning of the time and frequency estimates may be performed using the DM-RS and, if present, the CRS within the subframe in which data is received, and/or the initial signal. The signal used to reserve the channel before the actual start of data transmissions (e.g. reservation signal, initial signal, and/or burst indicator) may be used to fine tune time and frequency estimates before the reception of data. When transmitting data after a long absence of any discovery signal or other transmissions, the eNB may transmit a signal of longer duration to reserve the channel in order to facilitate the use of such a signal for timing and frequency adjustments.

CRS may not be transmitted in an activated subframe when a burst is not scheduled in that subframe. If there are no transmissions from the eNB for an extended duration (Toff), UE demodulation performance may be impacted due to lack of reference symbols for fine time/frequency tracking. The extent of performance impact depends on the amount of time for which there are no eNB transmissions. The impact may be mitigated by more frequent transmission of discovery signals.

Discovery signals may be transmitted by the eNB even when UEs are not being scheduled. Setting discovery signal periodicity based on UE RRM measurement requirements (e.g. 160 ms) may be more efficient than setting the periodicity based on UE fine time/frequency tracking requirement.

DRS design may allow DRS transmission on an LAA SCell to be subject to LBT. The transmission of DRS within a DMTC window if LBT is applied to DRS may consider many factors. Subjected to LBT, DRS may be transmitted in fixed time position within the configured DMTC. Subject to LBT, DRS may be transmitted in at least one of different time positions within the configured DMTC. The number of different time positions may be restricted. One possibility is one time position in the subframe.

The following signals or combination of the following signals may provide functionality for the UE's time/frequency synchronization for the reception of a DL transmission burst in LAA SCell(s): serving cell's DRS for RRM measurement, DRS for RRM measurement may be used at least for coarse time/frequency synchronization. Reference signals may be imbedded within DL transmission bursts (e.g. CRS and/or DMRS). If there is an additional reference signal, this signal may be used. Reference signals may be used at least for fine time/frequency synchronization. Other candidate signals (e.g., initial signal, DRS) may be considered.

DRS for RRM may also support functionality for demodulation of potential broadcast data multiplexed with DRS transmission. Broadcast data transmission with DRS may be supported. Other mechanism or signals (e.g., initial signal, DRS) for time/frequency synchronization may support reception of DL transmission burst Discovery signal may be transmitted via a successful LBT operation. When the CNB does not have access to the channel, the discovery signal burst may not be transmitted. In an example, the discovery signal periodicity is configured to be 40 ms, and it may be possible to receive the discovery signal at least once in every 160 to 200 ms with a high probability. For example, the probability of receiving a discovery signal burst at least once in every 160 ms may greater than 97%. The UE may adjust its receiver processing to account for the potential absence of discovery signals due to lack of access to the channel. For instance, the UE may detect the presence or absence of a particular discovery signal burst using the PSS, SSS and CRS signals. The use of discovery signals that may be subject to LBT. A discovery signal burst may not be transmitted when LBT fails.

For reception of data on the serving cell, AGC and fine time and frequency estimation may employ the discovery signals from the serving cell. Time and frequency estimation may be performed using the PSS, SSS and/or CRS inside the discovery signal subframes. The use of two or more CRS ports may enhance synchronization performance. These signals may provide synchronization estimates that are adequate for the purpose of RRM measurements on the serving and neighboring cells. When data is to be received by the UE in a subframe that occurs a significant number of subframes after the last reception of a discovery signal on the serving cell. Fine tuning of the time and frequency estimates may be performed using the DM-RS and, if present, the CRS within the subframe in which data is received, and/or the initial signal. The signal used to reserve the channel before the actual start of data transmissions (e.g. reservation signal, initial signal, and/or burst indicator) may be used to fine tune time and frequency estimates before the reception of data.

In legacy LTE technology, if the MAC entity receives an Activation/Deactivation MAC control element in a TTI activating the SCell, the MAC entity may: activate the SCell; e.g. apply normal SCell operation including: SRS transmissions on the SCell; CQI/PMI/RI/PTI reporting for the SCell; PDCCH monitoring on the SCell; PDCCH monitoring for the SCell. The MAC entity may start or restart the sCellDeactivationTimer associated with the SCell. The MAC entity may trigger PHR if the cell is configured with an uplink.

For Rel-12 and before, the UE expects to receive signals from the SCell when it activates an SCell. The UE receives signals such as CRS, CSI-RS, PSS, SSS that are transmitted in the SCell throughout the activated duration. The UE may perform (c) PDCCH monitoring and CSI measurement continuously, due to contiguous transmission. When the SCell is deactivated, the UE may not assume that there is transmission from the SCell other than discovery signal if DRS is configured.

In an unlicensed (e.g. LAA) cell, when the cell is activated, a UE may start performing the activation tasks including SRS transmissions on the SCell; CQI/PMI/RI/PTI reporting for the SCell; PDCCH monitoring on the SCell; PDCCH monitoring for the SCell. The MAC entity may start or restart the sCellDeactivationTimer associated with the SCell. The MAC entity may trigger PHR if the cell is configured with an uplink. Unlike in licensed cells, a UE may not need to perform PDCCH monitoring and CSI measurement continuously for an LAA cell. A UE may perform PDCCH monitoring when PDCCH is transmitted. A UE may perform CSI measurement when CSI-RS and/or CRS signals are transmitted. A UE may not perform PDCCH monitoring and CSI measurement when these signals are not transmitted. A UE may perform blind detection on whether SCell is transmitting CSI-RS (or a similar signal, e.g. DRS, CRS, SS, etc.). If the UE determines the activated SCell is transmitting CSI signal, the UE may measure and transmit CSI measurement to the eNB via PUCCH and/or PUSCH. If the UE determines the activated SCell is transmitting (c) PDCCH signal, the UE may monitor (c) PDCCH for the received DCIs.

A separate mechanism may be needed for the UE to determine that the activated LAA SCell is actually transmitting a signal. The corresponding cell operation may be performed for that signal (e.g. PDCCH/EPDCCH monitoring, CSI measurement and reporting) if the signal is transmitted.

In an example embodiment, when an unlicensed cell is activated in a UE by an eNB, the UE may need to detect the presence of the (e) PDCCH channel, if a UE implicitly or explicitly determines that (c) PDCCH is transmitted, the UE may monitor the channel. The UE may detect the presence of the PDCCH signal by blind decoding the physical signals on the unlicensed cell.

For example, the blind decoding may be based on detection of whether CRS power in a given subframe/symbol is above some certain threshold. A blind detection may detect that the CRS is transmitted, and if CRS is transmitted the UE may monitor PDCCH. In another example, the UE may blind decode the CRS signal, or SS transmission (e.g. in subframes 0 and 5), and/or CSI-RS in subframes that CSI-RS is configured. In an example embodiment, when a LAA cell is activated, the UE may blind decode for the presence of a PCFICH, the UE may implement blind decoding for physical signals (PCFICH, CRS, SS, etc.) to detect whether PDCCH is transmitted and whether PDCCH should be monitored. In an example embodiment, an indicator signal may be transmitted in every subframe in which (c) PDCCH is transmitted indicating the presence of the (c) PDCCH. A UE may blind decode the indicator signal to determine whether (e) PDCCH is transmitted. The indicator signal may be a known signal or have a known pattern or be selected from a set of known signals. For example, an indicator may be a combination of at least one of CSI-RS, CRS, PSS, SSS, DMRS, and/or the like.

When an SCell is activated, the UE may measure and transmit CSI during the downlink burst transmission. When there is no downlink burst (data burst) transmission, CSI (or any other signal suitable for CSI measurement, e.g. DRS, CRS, etc.) may or may not be transmitted during a subframe configured for CSI. Signal transmissions including DRS transmission is subject to LBT, and an eNB may not be able to transmit the CSI-RS signal due to a busy channel. In an example implementation, an eNB may selectively decide not to transmit CSI-RS in a configured subframe, to reduce interference to other cells. A UE may not assume CSI-RS is always transmitted in a configured CSI-RS subframe/symbol. When CSI-RS is configured for a LAA cell, the UE may first need to determine whether CSI-RS is transmitted, and if CSI-RS is transmitted the UE may measure the CSI-RS and report the CSI to the eNB. This is unlike legacy LTE-A technology, wherein a UE assumes that CSI-RS is transmitted in a configured CSI subframe/symbol/subcarrier. In an unlicensed (e.g. LAA) cell, CSI-RS may be transmitted in CSI-RS configured subframes during a downlink transmission burst.

CSI measurement by a UE when no downlink data burst is transmitted requires further improvement. When DRS is transmitted, DRS may be transmitted on an unlicensed cell, when the unlicensed cell is deactivated or activated for a UE. In an example embodiment, for an activated unlicensed cell, a UE may measure CSI when DRS is transmitted.

An eNB may transmit CSI-RS along with other signals (such as CRS, SS, or another other newly defined signal) to enable and/or support CSI-RS detection and measurement. For example, DRS may be used to measure CSI for an activated LAA cell. When an unlicensed cell (e.g. LAA cell) is activated, a UE first need to determine CSI-RS (or e.g. DRS) is transmitted. In an example implementation, the presence of the measurement signal (e.g. CSI-RS, DRS) may be detected by blind decoding in a subset of subframes employing the information about the DRS and/or CSI-RS configuration. When there is no downlink transmission data burst, the presence of the measurement signal (e.g. CSI-RS, DRS, etc.) may be detected by blind decoding.

When LAA cell is activated, the UE may first detect the presence of the measurement signal, and then measure the measurement signal. The UE may transmit the measured CSI in the first PUCCH opportunity (UCI) for CSI transmission (or via PUSCH TB piggy backing). In legacy LTE, the UE may measure CSI-RS in any subframe that CSI-RS is configured, and UE may transmit OOR signal if the measurement is unsuccessful or the measurement indicates an out of range (OOR) value.

When UE receives an activation command in subframe n to activate an SCell, the UE may start activation timer at n+k and start CSI transmission at n+k (e.g. k=8). The UE may initially transmit OOR CSI, until it successfully measures a valid CSI. Then the UE starts transmitting valid CSI based on UE measurements. After an eNB activated an SCell by transmitting an activation command, the eNB may initially receive OOR CSI values for the SCell from the UE (if valid CSI is not available) and then the CNB may receive valid CSI values. If the UE is able to activate the SCell quickly and if the UE was able to measure a valid CSI before the first available CSI transmission opportunity on or after n+k, the UE may transmit a valid CSI and may not transmit an OOR CSI. In a licensed cell, CSI RS is transmitted on an activated SCell and is received by a UE in the configured subframe/symbol/subcarriers, regardless of whether PDSCH signals are transmitted or not. In an LAA cell, CSI RS signals are transmitted as a part of DRS signal, or CSI RS signals are transmitted in CRS-RS configured subframe during a downlink transmission burst when PDSCH is transmitted.

In an example embodiment of the invention, if the MAC entity is configured with one or more SCells, the network may activate and deactivate the configured SCells. The SpCell may always be activated. The network may activate and deactivate the SCell(s) by sending the Activation/De-activation MAC control element. The MAC entity may maintain a sCellDeactivationTimer timer per configured SCell. The same initial timer value may apply to an instance of the sCellDeactivationTimer and sCellDeactivationTimer is configured by RRC. The configured SCells may be initially deactivated upon addition and after a handover. In an example embodiment, unlicensed cells (e.g. LAA cells) and licensed cells may be configured with the same or different deactivation timer value.

When the MAC layer determines that a secondary cell is deactivated or activated in a subframe, there may be a delay between the subframe when the determination was made and when the steps for deactivation or activation of the second-ary cell takes place. When MAC layer deactivates or acti-vates a secondary cell in a subframe (e.g. due to receiving a MAC Activation/Deactivation Command), the related actions may be taken after a certain delay (e.g. processing delay, hardware, etc.). The delay may depend on UE and eNB implementation and may be specified in the standard or preconfigured in the system. In an example embodiment, when a UE receives an activation command for a secondary cell in subframe n, the corresponding actions in the MAC layer may be applied no later than a minimum requirement (e.g. no later than a maximum activation delay in terms or subframes or ms) and no earlier than subframe n+8, except for the following: the actions related to CSI reporting; and the actions related to the sCellDeactivationTimer associated with the secondary cell which may be applied in subframe n+8.

In an example embodiment, when a UE receives a deac-tivation command for a secondary cell or the sCellDeacti-vationTimer associated with the secondary cell expires in subframe n, the corresponding actions may apply no later than the minimum requirement (e.g. no later than a maxi-mum deactivation delay), except for the actions related to CSI reporting which may be applied in subframe n+8.

In an example embodiment, a UE may transmit a UE capability message to the eNB. The UE capability message may be transmitted to the eNB in response to a request message received from the eNB. In an example embodi-ment, one or more parameters in the UE capability message may indicate that the UE supports configuration of a plu-rality of cells comprising licensed cells and unlicensed (e.g. LAA) cells.

In an example embodiment, one or more parameters in the UE capability message may implicitly or explicitly indicate that the UE may different maximum activation delay requirements for different types of cells. The capability indication may be implicit. For example, the one or more parameters in the capability message may indicate support for downlink LAA cells. The presence of the one or more parameters may indicate that the UE may support downlink LAA operation. Downlink LAA operation may include activation/deactivation of LAA cells, identification of down-link transmissions on LAA cell(s) for full downlink sub-frames, decoding of common downlink control signalling on LAA cell(s), CSI feedback for LAA cell(s), RRM measure-ments on LAA cell(s) based on CRS-based DRS, and/or the like. In an example, activation delay requirements for an unlicensed cell may indicate a faster activation delay for LAA cells. In an example, the activation delay may be faster for a certain cell type (compared with R-12 requirements).

In an example, the activation delay requirements may be different for a licensed cell compared with an unlicensed (e.g. LAA) cell.

An eNB may transmit to the UE an RRC message comprising configuration parameters of a plurality of cells comprising one or more licensed cells and one or more unlicensed (e.g. LAA) cells.

In an example, a UE may receive an activation command comprising one or more fields (parameters) instructing the UE to activate one or more licensed cell and one or more unlicensed cells. In an example, a UE may receive a first activation command comprising one or more first fields (parameters) instructing the UE to activate one or more licensed cell. The UE may receive a second activation command comprising one or more second fields (param-eters) instructing the UE to activate one or more unlicensed cells. The order in which an eNB transmits activation command(s) to activate secondary cell(s) is up to eNB implementation and may depend on the traffic and channel conditions.

When the UE receives a MAC CE instructing the UE to activate a LAA cell, the UE may be capable to transmit valid CSI report and apply actions related to the activation com-mand for the LAA cell being activated no later a first maximum number of subframes. When the UE receives a MAC CE instructing the UE to activate a licensed cell, the UE may be capable to transmit valid CSI report and apply actions related to the activation command for the licensed cell being activated no later a second maximum number of subframes. The first maximum number of subframes may be different than the second maximum number of subframes.

Discovery signal may be transmitted via a successful LBT operation. When the eNB does not have access to the channel, the discovery signal burst may not be transmitted. When a UE receives a MAC CE instructing the UE to activate an LAA cell, the UE may employ DRS signal on the LAA cell for synchronization and/or measurements. The first maximum number of subframes (maximum activation delay) for an LAA cell may depend on the number of times the discovery signal occasion is not available at the UE during the LAA cell activation time. When discovery signal is not transmitted one or more times, the first maximum number of subframes may be increased.

Implementing the same maximum number of subframes for activation delay for different cell types may delay activation delay in a UE and/or eNB. When LAA cells are introduced, different cell types may require different types of signals and may require the UE/eNB to perform different processes before performing actions related to the activa-tion. When the same maximum number of subframes is used for various cell types by the eNB/UE, then the eNB/UE may need to set the value of the maximum number of subframes to a larger number. This may result in a longer activation delay. The eNB may need to wait longer before the eNB can schedule downlink and/or uplink TBs and/or signals for the cell after transmitting the activation command for the cell. The example embodiments improve activation delay for a UE and/or cNB.

In an example embodiment, the activation delay require-ments may depend on cell type. For example, unlicensed (e.g. LAA) cells may have a shorter activation delay com-pared with the licensed cells. For example, activation requirement for a licensed cell may follow legacy require-ments. Activation timer and CSI transmission may start after 8 subframes. Other activities such as PDCCH monitoring may take longer (e.g. 24 msec) depending on the state of the UE when it receives the activation command. An eNB may receive OOR CSI from the UE until the UE is able to measure and transmit valid CSIs to the eNB. Activation delay for unlicensed (e.g. LAA) cells may be different. In an example, some of the activities such as PDCCH monitoring for a newly activated LAA cell may take less time compared with a licensed cell (e.g. 12 msec) depending on the state of the UE. In an example, an eNB may be able to start downlink transmission on a LAA cell earlier compared with downlink transmission on a licensed cell.

In an example embodiment, an eNB may transmit an RRC message comprising configuration parameters about a plurality of cells. The plurality of configuration parameters may determine (implicitly or explicitly) the activation delay of a configured SCell. For example, the configuration parameters may define a cell type, which may determine the activation delay requirements of that cell type. In an example, configuration parameters may define an activation delay requirement or an activation timer value, which may determine the activation delay for a configured cell.

In an example embodiment, the delay within which a UE may be able to activate a deactivated LAA cell may depend upon the UE conditions. Upon receiving SCell activation command in subframe n, the UE may be able to transmit valid CSI report and apply actions related to the activation command for the SCell being activated no later than in n+a first maximum number of subframes. In an example, when a different set of conditions are met for the SCell, then a different first maximum number of subframes may be employed. In an example, the first maximum number of subframes may be defined for a scenario in which some conditions are met for the SCell. The first maximum number of subframes may also depend on the number detection attempts needed to detect the cell. The first maximum number of subframes may be a sum of various parameters, e.g. a fixed pre-specified number, the periodicity of the DMTC, and/or the number of times the discovery signal occasion is not available at the UE during the SCell activation time.

In an example, if there is no reference signal received for the CSI measurement over the delay corresponding to the minimum requirements specified above, then the UE may report corresponding valid CSI for the activated SCell on the next available uplink reporting resource after receiving the reference signal. In an example, if there are no uplink resources for reporting the valid CSI in subframe n+ first maximum number of subframes then the UE may use the next available uplink resource for reporting the corresponding valid CSI. In an example scenario, the valid CSI may be based on the UE measurement and corresponds to any CQI value with the exception of CQI index=0 (out of range). In addition to CSI reporting defined above, UE may apply other actions related to the activation command for an SCell at the first opportunities for the corresponding actions once the SCell is activated.

In an example embodiment, the delay within which the UE may be able to activate a deactivated licensed SCell may depend upon the UE conditions. Upon receiving SCell activation command in subframe n, the UE may be capable to transmit valid CSI report and apply actions related to the activation command for the SCell being activated no later than n+a second maximum number of subframes. In an example, the second maximum number of subframes may be defined for a scenario in which some conditions are met for the SCell. In an example, when a different set of conditions are met for the SCell, then a different second maximum number of subframes may be employed. The second maximum number of subframes may also depend on the number detection attempts needed to detect the cell.

If there is no reference signal received for the CSI measurement over the delay corresponding to the minimum requirements specified above, then the UE may report corresponding valid CSI for the activated SCell on the next available uplink reporting resource after receiving the reference signal. If there are no uplink resources for reporting the valid CSI in after the second maximum number of subframes then the UE may use the next available uplink resource for reporting the corresponding valid CSI.

An example flow as per an aspect of an embodiment of the present invention is described. The flow may be processed as a method. The flow may be executed by a wireless device. The wireless device may comprise one or more processors and memory storing instructions that, when executed, cause the wireless device to perform actions described in the flow.

At least one first message maybe transmitted indicating that a wireless device supports configuration of a plurality of licensed cells and a plurality of licensed assisted access (LAA) cells. A media-access-control control element (MAC CE) comprising at least one parameter may be received in a first subframe. The parameter(s) may instruct the wireless device to activate at least one licensed cell and at least one LAA cell. Channel monitoring on the LAA cell(s) may be performed before a first maximum number of subframes after the first subframe. Channel monitoring on the licensed cell(s) may be performed before a second maximum number of subframes after the first subframe. The first maximum number of subframes and the second maximum number of subframes may be different.

According to an embodiment, at least one second message may be received. The second message(s) may comprise configuration parameters of a plurality of cells. The plurality of cells may comprise the at least one licensed cell and the at least one LAA cell. The configuration parameters may comprise a deactivation timer.

According to an embodiment, transmission of first valid channel state information (CSI) reports may be started for the at least one LAA cell before the first maximum number of subframes after the first subframe. The transmission of first out of range (OOR) CSI reports for the at least one LAA cell may be started before the valid CSI reports are available. The transmission of the first valid CSI reports may start a first number of subframes after the first subframe.

According to an embodiment, the performing channel monitoring on the at least one LAA cell may start a first number of subframes after the first subframe. According to an embodiment, the first maximum number of subframes may be smaller than the second maximum number of subframes. According to an embodiment, an activation delay of a cell may depend on whether the cell is licensed or LAA. According to an embodiment, channel monitoring may comprise monitoring a physical downlink control channel.

An example flow as per an aspect of an embodiment of the present invention is described. The flow may be processed as a method. The flow may be executed by a wireless device. The wireless device may comprise one or more processors and memory storing instructions that, when executed, cause the wireless device to perform actions described in the flow.

At least one first message may be transmitted. The first message(s) may indicate that a wireless device supports configuration of a plurality of licensed cells and a plurality of licensed assisted access (LAA) cells. A media-access-control control element (MAC CE) may be received in a first subframe. The MAC CE may comprise at least one first parameter. The parameter may instruct the wireless device to activate at least one licensed cell. A second MAC CE may be received in a second subframe. The second MAC CE may comprise at least one second parameter. The second parameter may instruct the wireless device to activate at least one LAA cell. Channel monitoring may be performed on the at least one LAA cell before a first maximum number of subframes after the first subframe. Channel monitoring may be performed on the at least one licensed cell before a second maximum number of subframes after the second subframe. The first maximum number of subframes and second maximum number of subframes may be different.

According to an embodiment, at least one second message, may be received. The second message(s) may comprise configuration parameters of a plurality of cells. The plurality of cells may comprise the at least one licensed cell and the at least one LAA. According to an embodiment, transmission of first valid channel state information (CSI) reports for the at least one LAA cell may be started before the first maximum number of subframes after the first subframe. According to an embodiment, transmission of first valid CSI reports may be started a first number of subframes after the first subframe. According to an embodiment, transmission of second valid CSI reports for the at least one licensed cell may be started before the second maximum number of subframes after the second subframe. According to an embodiment, transmission of second valid CSI reports for the at least one LAA cell may be started a first number of subframes after the second subframe. According to an embodiment, the performing channel monitoring on the at least one LAA cell may start a first number of subframes after the first subframe. According to an embodiment, the performing channel monitoring on the at least one licensed cell starts a first number of subframes after the second subframe. According to an embodiment, the first maximum number of subframes may be smaller than the second maximum number of subframes.

Activating a large number of carriers on dynamic bases may increase the UE power consumption, false alarm probability, and processing power requirements. Improved mechanisms are needed to improve efficiency in the UE and enable fast and dynamic carrier selection/activation in a UE. Novel mechanisms may reduce UE power consumption, reduce false alarm probability and reduce processing power requirements. Carrier selection and activation may be enhanced to achieve fast dynamic carrier selection (or switching). A fast activation procedure for the carrier (e.g. shorter than the currently defined 24 ms) may be defined to improve efficiency.

Current SCell activation latency may include the MAC CE decoding latency (~3-6 ms) and SCell activation preparation time (RF preparation, up to ~18 ms). Implementation of faster processes and hardware may reduce these delays. SCell MAC activation/deactivation signalling is UE-specific. Signalling overhead may be a concern especially if the cell used for transmitting the signal is a macro cell. In an example embodiment, a L1 procedure/indicator may be introduced and/or SCell activation signalling may be enhanced.

Layer one signalling (e.g. PDCCH/EPDCCH from the PCell or another serving cell) may be implemented to signal the set of carriers that the UE may monitor for PDCCH/EPDCCH and/or measuring/reporting CSI. Control signalling latency may be ~0.5-2 ms (e.g. one PDCCH transmission plus 0.5 ms decoding). The DCI format may be of small size for transmission reliability and overhead reduction. To reduce control signalling overhead, the signalling may be a UE PCell common signalling. The indication may be sent on a carrier that the UE is currently monitoring.

In an example embodiment, a mechanism based on a L1 indication for starting/stopping monitoring of up to k activated carriers may be provided. The UE may be configured with n>=k CCs. k CCs may be activated via MAC signalling of SCell activation/deactivation. Then based on LBT progress over the CCs, a L1 indication is sent to inform which of the k CCs may be monitored by the UE and which may not. The UE may then receive data burst(s) on the monitored CCs. Another L1 indication may be sent after the bursts to alter which CCs may be monitored since then, and so on. The L1 indication may be explicit (e.g., based on a signalling) or implicit (e.g., based on self scheduling and UE detection of scheduling information on the SCell). For this example, fast carrier switching is done among at most k CCs.

In an example embodiment, a mechanism based on a L1 signalling for starting/stopping monitoring of up to m activated carriers (the number of p configured carriers may be m or higher). The activated carriers may be more than n (e.g., there may be more CCs activated for the UE than its PDSCH aggregation capability: n). The UE is configured with p CCs, and there may be up to m CCs that are activated via MAC signalling of SCell activation/deactivation. The UE may not monitor all the activated CCs. The UE may monitor at most n CCs according a L1 indication (n<=m). The L1 indication needs to be explicit. For this example, fast carrier switching may be done among possibly more than n CCs.

SCell activation/deactivation enhancements may be considered for fast carrier switching. SCell MAC activation/deactivation signalling is a MAC signalling. MAC signalling decoding/detection (with or without enhancements) may be slower than L1 signalling decoding/detection. It may involve decoding/detection of a L1 signalling and furthermore, a PDSCH TB. If SCell activation/deactivation is carried by a L1 signalling, it may still be considered for fast carrier switching. In an example embodiment, a mechanism based on a L1 signalling for activation/deactivation of the p configured carriers is described. The UE is configured with p CCs. At a given subframe, at most n CCs are activated via a L1 signalling of SCell activation/deactivation. For instance, based on LBT progress over the CCs, a L1 signalling is sent to inform which of the m CCs are activated. The UE may receive data burst(s) on the activated CCs. Another L1 signalling may be sent after the bursts to alter the activated CCs.

The control signalling may be transmitted before the eNB has gained access to the carrier via LBT process. An eNB may inform the UE to start (or stop) monitoring a carrier (whether the UE would receive a burst or not depends on the presence of PDCCH scheduling information for the carrier). An indication for starting monitoring may be used for more than one burst, until an indication for stopping monitoring is sent. The indication may be sent when the eNB expects the (E) CCA is to complete soon. A purpose of the indication may be to inform a UE to start or stop monitoring a carrier.

Transmitting the control signalling after the eNB has gained access to the carrier may incur overhead of the reservation signal (proportional to the control signalling latency). In an example, the maximum transmission burst may be 4 ms. An eNB may inform the UE to receive a burst on a carrier. The eNB may send one indication for a burst. There may be many short bursts (e.g., one burst may last only up to 4 milliseconds in certain regions). The indication may be sent after (E) CCA is completed, consuming some portion of the maximum allowed transmission duration for a burst.

It may still be up to the network to transmit the control signalling before or after the channel is occupied. A UE may detect that the burst is from the serving cell (e.g. by confirming PCID or other type of decoding). The function of the control signalling is to indicate that the UE may perform DL transmission burst detection of the serving cell. If a DL burst of the serving cell is detected, UE may monitor for possible PDCCH/EPDCCH and/or measuring the CSI on the indicated SCell.

In an example embodiment, a UE may be configured with a number of carriers potentially exceeding the maximum number of carriers over which the UE may aggregate PDSCH. RRM measurements over the configured carriers may be supported, e.g. RSSI-like measurement, extension of quasi co-location concept to across collocated intra-band carriers, and/or carrier grouping. L1 indication to the UE to start monitoring a carrier, which is selected from the configured carriers by the eNB may be supported.

An eNB may configure UE with more component carriers which may potentially exceed the maximum number of carriers over which the UE may aggregate PDSCH. Then eNB may activate one or more carriers among the configured carriers to UE by the existing signalling, e.g. MAC signalling. UE may be scheduled by the eNB on the one or more activated carriers dynamically based on the LBT mechanism.

A UE may switch to receive on any carrier within a set of carriers selected by the serving eNB as fast as subframe/symbol-level, while the number of carriers within the set may potentially exceed the maximum number of carriers over which the UE may aggregate PDSCH. Which carrier(s) the UE may switch to is per eNB indication. When the UE is indicated with the carrier(s) it may switch to, the UE may start to monitor the indicated carrier(s), e.g. within a few subframes, and may stop monitoring other carriers. By monitoring a carrier it meant to buffer and attempt to detect the control channels and other associated channels. The CNB indication may instruct the UE to switch to the indicated carrier(s) and monitor the carrier(s). The eNB may not instruct the UE to switch to monitor on more carriers than its PDSCH aggregation capability in a given subframe. The eNB may not schedule the UE on more carriers than its PDSCH aggregation capability. SCell configuration enhancements may allow both semi-static and fast carrier switching with reduced transition time. The delay associated with the SCell configuration signalling as well as the delay associated with the measurement process may be decreased.

In an example embodiment, fast carrier switching may support UE to switch to any carrier within a set of carriers selected by the serving eNB as fast as a few subframes/symbols. The CNB may send an indication instructing the UE to switch to the indicated carriers and monitor the carriers. Then the UE may perform the switching and start monitoring the indicated carriers. The UE stops monitoring other carriers. The eNB indication may be done in L1. A L1 procedure/indicator, or an enhancement of the SCell activation signalling may be introduced.

In an example embodiment, a two phase activation process may be introduced for SCells: MAC activation and PHY activation (also may be called fast carrier switching, fast activation, carrier switching, and/or the like). In an example embodiment, an eNB may MAC activate an SCell in the UE by transmitting a MAC Activation Command. When an SCell in the UE is MAC activated, the UE may monitor PCell common search space for a physical layer activation (may also be called fast activation, cell switching, etc.) command/indicator. A UE may start blind decoding for physical layer control channels (and/or physical signals, e.g. CRS, initial signals, and/or burst indicator) when it is physical layer (PHY) activated. When an SCell in a UE is MAC activated but not yet PHY activated, the UE may not monitor for the physical layer control channels on the SCell.

In an example embodiment, a UE may monitor for CSI-RS and other signals on an SCell when the SCell is MAC activated and PHY deactivated. In an example, a UE may not monitor for CSI-RS and some other signals on an SCell when the SCell is MAC activated and PHY deactivated. Monitoring for PHY layer signals when the SCell is MAC activated but PHY deactivated may depend on UE/eNB implementation. A UE may not decode and monitor physical control channels (e.g. PCFICH, (c) PDCCH) and PDSCH on SCells that is MAC activated and PHY deactivated. The signal processing requirements on a PHY deactivated SCell may be minimum compared with when the SCell is PHY and MAC activated. In an example, when an SCell is MAC deactivated, the UE may not expect receiving a PHY activation for the SCell from an eNB. An eNB may PHY activate cells that are MAC activated in a UE.

In an example embodiment, a UE may monitor PCell PDCCH common search space when an SCell is MAC activated. When a UE receives a PHY activation indicator on the PCell common search space for an SCell, the UE may PHY activate the SCell. For example, when a UE receives a PHY activation indicator for an SCell in subframe n, the UE may PHY activate the SCell in subframe n, n+1, or n+2 depending on the PHY activation delay.

A mechanism may be needed for the UE to determine that the PHY activated LAA SCell is actually transmitting a signal and the corresponding cell operation may be performed for that signal (e.g. PDCCH/EPDCCH monitoring, CSI measurement and reporting).

In an example embodiment, when an unlicensed cell is PHY activated in a UE by an eNB, the UE may need to detect the presence of the (c) PDCCH channel. When a UE implicitly or explicitly determines that (c) PDCCH is transmitted, the UE may monitor the channel. The UE may detect the presence of the PDCCH channel by receiving a signal on the PCell common search space. The UE may detect the presence of the PDCCH signal by blind decoding the physical signals on the unlicensed cell.

For example, the blind decoding may be based on detection of whether CRS power in a given subframe/symbol is above some certain threshold. A blind detection may detect that the CRS is transmitted, and if CRS is transmitted the UE may monitor (c) PDCCH. In another example, the UE may blind decode the CRS signal, or SS transmission (e.g. in subframes 0 and 5), and/or CSI-RS in subframes that CSI-RS is configured. In an example embodiment, when a U-Cell is PHY activated, the UE may blind decode for the presence of a burst-indicator and/or initial-signal. The UE may search for burst-indicator and/or initial signal to determine the beginning of a burst. For subsequent subframes, the UE may implement blind decoding for physical signals (PCFICH, CRS, SS, etc.) to detect whether PDCCH is transmitted and whether PDCCH should be monitored. In an example embodiment, an indicator signal may be transmitted in every subframe in which (c) PDCCH is transmitted indicating the presence of the (c) PDCCH. UE may blind decode the indicator signal to determine whether (c) PDCCH is transmitted. The indicator signal may be a known signal or have a known pattern or be selected from a set of known signals.

For example, an indicator may be a combination of at least one of CSI-RS, CRS, PSS, SSS, DMRS, and/or the like.

If a burst indicator indicating the length of a burst (or end of a burst) is not transmitted (via PHY or higher layers), the UE may perform blind decoding for the presence of the control channels in subsequent subframes of a burst. The UE may not know the length of a burst and whether a subframe was the last subframe in a burst.

In an example embodiment, PCell common search space may indicate the PHY activation of given U-Cell to a UE. An eNB may transmit at least one RRC message to a UE to configure parameters related to PCell common search space for the transmission of indication of PHY activation of one or more U-cell. The RRC message may comprise a signal-RNTI, a signal indicator periodicity, a signal indicator bitmap, and/or other parameters. Some of the parameters such as signal indicator periodicity, a signal indicator bitmap, and/or other signal parameters may be optional and may or may not be included in the RRC message depending on an eNB implementation. These fields may be included in an information element, e.g. called signal-LAA-Config-r13, that is included in the configuration of the dedicated parameters e.g. of the PCell. The IE signal-LAA-Config may be used to specify the RNTI used for PHY activation indicator and the subframes used for PHY activation indicator transmission. An example information elements in an RRC connection reconfiguration is shown below (some of the parameters may be optional):

> signal-LAA-Config::=CHOICE {release NULL, setup
> SEQUENCE {signal-RNTI C-RNTI, signal-Indicator-
> Periodicity ENUMERATED {e.g. sf10, sf20, sf40,
> sf80}, signal-IndicatorSubframeSet BIT STRING
> (SIZE (e.g. 10)), signal-other-parameters signal-Other-
> type of activation, etc (for U-Cells)}}

The UE may monitor PCell common search space for a common search space for a DCI scrambled with signal-RNTI according to common search space search process. If the RRC comprises signal-IndicatorPeriodicity-r13, the UE may configure the periodicity to monitor PDCCH with signal-RNTI. For example, value sf10 corresponds to 10 subframes, sf20 corresponds to 20 subframes and so on.

If the RRC comprises signal-IndicatorSubframeSet-r13, the UE may configure the subframe(s) to monitor PDCCH with signal-RNTI within the periodicity configured by signal-indicatorPeriodicity (if periodicity is configured). If periodicity is not configured, the periodicity may be the length of the bit string of signal-IndicatorSubframeSet-r13 in terms of subframes. The example, 10 bits correspond to subframes in the last radio frame within each periodicity (e.g. if periodicity is not configured, it is 10 subframe). For example, the left most bit is for subframe 0 and so on. A bit can be of value 0 or 1. In an example implementation, the value of 1 means that the corresponding subframe is configured for monitoring PDCCH with signal-RNTI, and the value of 0 means otherwise. In case of TDD as PCell, only downlink subframes indicated by the DL/UL subframe configuration in SIB1 may be configured for monitoring PDCCH with signal-RNTI. In case of FDD as PCell, any of the ten subframes may be configured for monitoring PDCCH with signal-RNTI. The IE signal-other-parameters may comprise one or more cell configuration parameters, for example, the parameter may determine PHY activation type, CSI signal format, activation duration, starting symbol, type, and/or for other cell configuration parameters.

The example embodiment, provides flexibility in transmission of PHY activation indicator configuration in addition to providing battery saving and processing power saving opportunities. In R-12 and before, activation command can be transmitted in any subframe. Following R-12 principles, there would be no reason to transmit an additional bitmap and/or period for the common search space monitoring. In a U-Cell, the eNB may not be able to PHY activate a U-Cell for a UE in a given subframe according to the RRC configuration. The indicator transmitted in PCell common search space provides flexibility to transmit PHY activation in a configured subframe. Transmitting PHY activation in any subframe, may require UE to search common search space in every subframe, which requires extra processing. The bitmap (and/or period) provides flexibility in limiting the subframes, in which UE needs to search for PHY activation. In an example embodiment the bitmap may be configured as [1100011000]. In the example, PHY activation may be transmitted in subframes 0, 1, 5, and 6. In an example embodiment, the bitmap and periodicity may not be implemented for PHY activation indicator.

In release 13 and beyond up to 32 cells (or more) may be configured, due to limited DCI size in common search space, a DCI may not be large enough to transmit PHY activation indication for all the cells. In an example, the bitmap and period may be configured for a U-cell (instead of for all U-cells), and the bitmap and/or period may allow the eNB to divide the subframes in multiple sets, a first subframe set indicated by a first bitmap may be for transmitting indicator for a first subset of cells, and a second subframe set indicated by a second bitmap may be for transmitting indicator for a second subset of cells. In this example, the subframe bitmap may be a cell specific parameter instead of being a UE specific parameter as shown in the example above.

The one or more RRC messages may comprise one or more parameters for a U-cell to configure the format of the DCI and how the bits in the DCI may be interpreted. In an example embodiment, one or more parameters for an LAA cell may comprise signal-DCI-Index-r13 and/or Other-signal-parameters. For example, signal-DCI-Index-r13 may determine the index of the bits in the DCI control packet associated with a given U-cell. For example, when the index is 4, it may indicate the fourth subset of bits in the DCI corresponds to the given U-cell for the UE. The IE signal-other-parameters may comprise one or more signal configuration parameters, for example, the parameter may determine signal format, activation type, duration. An example, RRC information element for a given U-cell is shown below:

> signal-LAA-SCell::=CHOICE {release NULL, setup,
> SEQUENCE {signal-DCI-Index INTEGER (1 . . . xx),
> Other-signal-parameters Other-signal-Parameters}}

DCI format employed in PCell common search space and employed for PHY activation transmission indication is shown as bellow. The following information may be transmitted by means of the DCI format including multiple set of k bits. For example, the signal transmission configuration indication may comprise {signal number 1, signal number 2, . . . , signal number I}.

Where a signal number is k bit(s), and index I=floor (L/k), wherein L is equal to the payload size of DCI (for example, DCI format 1C used for very compact scheduling of one PDSCH codeword). K may be 1 or greater than 1, e.g. 2, 3, or 4. The parameter signal-DCI-Index provided by higher layers determines the index to the signal indication for a serving cell. In an example implementation, zeros may be added until the size is equal to that of format 1C used for very compact scheduling of one PDSCH codeword.

In an example configuration, DCI {1,1,0,0,00000000} may be transmitted, which indicates the PHY activation is triggered for the first and second configured cell, and is not triggered for the third and fourth configured cell (according to siganl-DCI-Index-r13 for cells), additional zeros may be padding. In an example, the cell PHY activation may be UE specific. The first bit may correspond to PHY activation of a first cell in a first UE, the second bit may correspond to the PHY activation of a second cell in a second UE. The eNB may configure the indexes for different UEs according to eNB internal activation mechanism.

In another example, DCI {2,1,0,3,000000} may be transmitted, which indicates the PHY activation type 2 is triggered for the first cell PHY activation type 1 is triggered for the second configured cell, and no PHY activation is triggered for the third cell and PHY activation type 3 is triggered for the fourth configured cell (according to siganl-DCI-Index-r13 for cells), additional zeros may be padding. PHY activation types may be determined according to a predefined configuration table or RRC configuration parameters.

In an example embodiment, more than 1 bit may be used for signal number. More than 1 bit may be used for signal number, e.g., to determine a specific configuration for the transmitted signal, or for indication of a type of PHY activation. For example, when signal number is 2 bits, each indication could be for one of the four configurations.

UEs may be grouped using the same or different RNTIs or indexes for signal transmission. One UE may have multiple RNTI for different cells or different purposes, e.g. a first RNTI may be for a first subset of cells, and another RNTI may be for a second subset of cells. This configuration of RNTI for different UEs and different cells depends on eNB implementation and the parameters in RRC messages. An eNB may employ RNTI, subframe and/or index resources by transmitting RRC configuration messages to the UE. In an example embodiment, a first set of UEs may be configured with one RNTI, and a second set of the UEs may be configured with a second RNTI for PHY activation indication. In an implementation example, different subsets of UEs could monitor different subset of subframes (controlled by bitmap and/or period) for PHY activation indication using the same RNTI. PHY activation indicator may be a configured as a multicast message to many UEs by the eNB. This may be performed by configuring the same parameters for a given cell for a group of UEs. PHY activation indicator may be a configured as a unicast message to a UE by the eNB. This may be performed by configuring different parameters for a given cell for different UEs. This mechanism described in example embodiments provides flexibility and eNB may configure the parameters selectively to enhance network capacity and efficiency.

A UE may monitor the PCell common search space, when the common search space is configured with signal-RNTI and at least one cell with this configuration is MAC activated. When for example all U-cells configured with signal-RNTI are MAC deactivated, the UE may not monitor the common search space. If a UE receives a MAC activation command in subframe n for a first cell, the UE may start monitoring the common search space for a DCI associated with signal-RNTI at subframe n+k, wherein k is a predefined number for example, 3, 6 or 8. K may depend on cell activation delay.

If a UE is configured by higher layers to decode PDCCHs with the CRC scrambled by the signal-RNTI, the UE may decode the PDCCH according to the common search space configuration. The subframes in which the UE monitors PDCCH with CRC scrambled by signal-RNTI are configured by higher layers (RRC). If UE is not configured with the parameter signal-LAA-Config-r13 for any activated serving cell, the UE is not expected to monitor PDCCH with CRC scrambled by signal-RNTI.

Example embodiment may be extended to transmit additional indications to a UE on PCell common search space for an SCell. For example, indications for an SCell may include burst indication, CSI transmission, burst duration, uplink subframes, uplink duration, downlink/uplink configuration, subframe configuration, and/or the like. The DCI format for each of these indications may be different.

In an example, a new DCI format may be defined. For example, DCI format may include an initial format bits determining the type, format and the purpose of the DCI, and the additional bits in the DCI may be interpreted according to the format bits. For example, DCI format may be {DCI type, indication number 1, indication number 2, indication number 3, . . . }. When DCI type is zero, the indication numbers may be for CSI transmission according to the configured index for CSI transmission on U-Cell for a UE. When DCI type is one, the indication numbers may be for PHY activation of a U-cell in a UE according to the configured index for a U-Cell activation for a UE. For example, other DCI types may be defined for DRS transmission, burst indicator, burst duration, (e) PDCCH, and other signal examples provided in the specification.

An RRC message may comprise configuration parameters of the search space, e.g., RNTI, periodicity and/or subframe bitmap for the indication. An indication may have its own RNTI, or different indications may share the same RNTI. It is up to eNB to configure common search resources (RNTI, subframe, indexes) for different types of indications. A UE may be configured with an index for a Cell (RRC may comprise an index) to determine the index of the bits in the DCI employed for the indication of the cell for the UE.

For example, RNTI of 3 in a first subset of subframe may be configured for transmission of CSI indication for a first subset of UEs on first subset of cells according to DCI format 1. RNTI of 4 in a second subset of subframe may be configured for transmission of fast activation indication for a second subset of UEs on second subset of cells according to DCI format 2. It is up to eNB implementation to employ common search space resources according to the available RRC message format and UE capabilities.

The process described above may also be employed for PHY deactivation of an SCell in a UE. For example bit value of 1 in a DCI may indicate PHY activation of an SCell and bit value of 0 in a DCI may indicate PHY deactivation of an SCell.

In an example embodiment, cells in the same band transmitted from the same transmission point, or cells within a configured group may be PHY activated or PHY deactivated together. This could be an implementation option in an eNB. In another example embodiment, the same DCI index could be assigned to cells within a group. This may imply that the same bits apply to the cells of the same group. In an example, if a cell is MAC deactivated within a group, the cell may not be PHY activated.

In an example embodiment, a DCI transmitted in the dedicated search space may be transmitted to indicate PHY activation for an SCell. The dedicated DCI may be transmitted using the C-RNTI employed for transmission of DCI in the dedicated search space of the PCell or an SCell cross carrier scheduling the SCell. The UE may monitor a dedicated search space for a DCI scrambled with C-RNTI according to the dedicated search space search process. In an example implementation, a new DCI may be introduced for PHY activation of an SCell. In an example implementation, a new field may be introduced to a DCI for PHY activation of an SCell. The new DCI or the new field may include a bitmap, wherein a bit (or a set of bits) may be employed for PHY activation and other indications of an SCell. The correspondence between the bits (the index of the bits) and the SCell may be predefined. For example, the order of the bits in the bitmap may be according to the cell index of the configured cells. In an example embodiment, a bitmap format similar to the MAC activation bitmap may be employed. In an example embodiment, the bitmap may include 8 bits, when 8 cells are configured, or when the highest cell index is smaller than (or equal) to 8. The bitmap may include 32 bits, when the highest cell index is larger than 8.

In an example implementation, the correspondence between the bits and the SCell may be configured via an RRC message transmitted from the CNB to the UE. The RRC message may comprise an index for an SCell identifying the index of the bit(s) in the DCI that corresponds to the cell. When the UE receives a dedicated DCI for PHY activation and/or deactivation of a cell, the UE may PHY activate the cell.

In an example embodiment, a more generic dedicated DCI may be introduced to indicate cell PHY activation and other cell and UE specific indication. For example, a format of the DCI may be employed for burst indication on a given cell. A format of the DCI may be employed for aperiodic CSI triggering for a UE on a given cell. Other trigger mechanism using dedicated DCI may be implemented.

In an example embodiment, when a cell is PHY activated, the UE and eNB may restart the MAC sCellDeactivationTimer timer corresponding to the SCell. When a UE receives a PHY activation command from the CNB in subframe n, the UE may restart the MAC sCellDeactivationTimer timer corresponding to the SCell in subframe n, in subframe n+k (wherein k is a predefined number, e.g. 1, 2, 3). This process may ensure that the UE may not MAC deactivate an SCell when sCellDeactivationTimer timer is close to the expiry and the UE has PHY activated an SCell.

In an example embodiment, when sCellDeactivationTimer timer corresponding to the SCell expires, the UE may deactivate the SCell by deactivating both PHY and MAC layers. The UE may perform RRM measurement on a MAC/PHY deactivated SCell. When a UE receives a PHY deactivation indication from the eNB, the UE may deactivate the PHY layer, but may not change the status of the MAC activation.

In an example embodiment, a PHY deactivation timer may be configured for an SCell. The PHY deactivation may be controlled by a PHY deactivation timer. The UE may receive an RRC message configuring the PHY deactivation timer for an SCell of a UE. In an example embodiment, a cell may have its own configured PHY deactivation timer, but a single PHY deactivation timer value may be applicable to more than one SCell (for example, all U-Cells, or all SCells). In an example embodiment, a first PHY deactivation timer value may be applicable to U-cells and a second first PHY deactivation timer value may be applicable to licensed cells. An RRC comprising the timer values may be transmitted to a UE to configure the PHY deactivation timers.

The UE may start a PHY deactivation timer for an SCell, when the UE receives a PHY activation indicator. For example, when a UE receives a PHY activation indicator in subframe n for an SCell, the UE may start the PHY deactivation timer for the SCell in the same subframe (or after a certain delay, e.g. 1, 2, 3 or 4 subframes).

In an example embodiment, if (e) PDCCH on the activated SCell indicates an uplink grant or downlink assignment; or if PDCCH on the Serving Cell scheduling the activated SCell indicates an uplink grant or a downlink assignment for the activated SCell: the UE may restart the PHY deactivation timer associated with the SCell. The UE may also restart the sCellDeactivationTimer of the SCell. In an example embodiment, additional conditions may be defined for restarting the PHY deactivation timer. For example, an SCell PHY deactivation timer may be restarted when A-CSI is triggered on the Cell, or a downlink or uplink burst is started on the SCell. The timer may be maintained in both the UE and the eNB.

In an example embodiment, MAC sCellDeactivationTimer value may be greater than PHY deactivation timer. This may cause the UE stay MAC activated as long as the SCell is PHY activated, or may reduce the probability of such event. PHY activation timer and MAC sCellDeactivationTimer are running when an SCell is both PHY and MAC activated. When PHY deactivation timer expires, the UE may be PHY deactivated. The UE may remain MAC activated and monitor the search space for receiving a PHY activation indication for the SCell. When MAC activation timer expires, or a UE receives a MAC deactivation command, the UE may stop the PHY activation timer (if it is running) of the SCell and MAC deactivate the SCell.

In an example embodiment, SCell PHY deactivation may be performed when a UE receives a PHY deactivation indicator for the SCell from the eNB. SCell PHY deactivation may be performed when the PHY deactivation timer of an SCell expires in a UE. When a UE receives a PHY deactivation indicator for an SCell from the eNB, the UE may stop the PHY deactivation timer and PHY deactivate the SCell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A wireless device comprising:
one or more processors; and
memory storing instructions that, when executed by the one or more processors, cause the wireless device to:
receive one or more radio resource control (RRC) messages configuring:
a first medium access control (MAC) cell deactivation timer for MAC activating a cell; and
a second deactivation timer associated with monitoring a physical downlink control channel for the cell;
receive a MAC control element (CE) indicating MAC activating the cell;
in response to receiving the MAC CE, MAC activate the cell and start the MAC cell deactivation timer;
receive a first downlink control information (DCI) comprising a field indicating activation to monitor the physical downlink control channel;
based on receiving the first DCI:
start monitoring the physical downlink control channel;
start the MAC cell deactivation timer; and
start the second deactivation timer;
receive a second DCI comprising a field indicating not monitoring the physical downlink control channel; and
based on the second DCI, stop monitoring the physical downlink control channel, wherein the cell is maintained as MAC activated.

2. The wireless device of claim 1, wherein the instructions, when executed by the one or more processors, further cause the wireless device, when the first MAC cell deactivation timer expires or the wireless device receives a MAC deactivation command for the cell, to:
stop the second deactivation timer;
stop the first MAC cell deactivation timer;
MAC deactivate the cell; and
stop monitoring the physical downlink control channel.

3. The wireless device of claim 2, wherein the instructions, when executed by the one or more processors, further cause the wireless device, when the second deactivation timer expires, to:
stop monitoring the physical downlink control channel;
maintain the cell as MAC activated; and
start monitoring a search space for receiving an indication to monitor the physical downlink control channel.

4. The wireless device of claim 3, wherein the instructions, when executed by the one or more processors, further cause the wireless device to monitor the physical downlink control channel when the first MAC cell deactivation timer and the second deactivation timer are running.

5. The wireless device of claim 3, wherein the instructions, when executed by the one or more processors, further cause the wireless device to start monitoring a second physical downlink control channel based on the second DCI.

6. The wireless device of claim 3, wherein the instructions, when executed by the one or more processors, further cause the wireless device to:

receive a third DCI indicating an uplink grant or downlink assignment for the cell; and based on the third DCI:

start the first MAC cell deactivation timer;

start the second deactivation timer; and start monitoring the physical downlink control channel.

7. The wireless device of claim 1, wherein the second deactivation timer is associated with PHY activation and PHY deactivation, and wherein:

the PHY activation comprises monitoring the physical downlink control channel; and the PHY deactivation comprises not monitoring the physical downlink control channel.

8. The wireless device of claim 7, wherein the instructions, when executed by the one or more processors, further cause the wireless device to:

receive a third DCI indicating an uplink grant or downlink assignment for the cell; and based on the third DCI:

start the first MAC cell deactivation timer;

start the second deactivation timer; and start monitoring the physical downlink control channel.

9. The wireless device of claim 8, wherein the instructions, when executed by the one or more processors, further cause the wireless device to, based on the second DCI, switch to monitor another physical downlink control channel.

10. The wireless device of claim 9, wherein the instructions, when executed by the one or more processors, further cause the wireless device to stop monitoring the physical downlink control channel, based on the second deactivation timer expiring.

11. The wireless device of claim 10, wherein the instructions, when executed by the one or more processors, further cause the wireless device to stop the second deactivation timer in response to receiving the second DCI.

12. The wireless device of claim 7, wherein the instructions, when executed by the one or more processors, further cause the wireless device, when the second deactivation timer expires, to:

stop monitoring the physical downlink control channel;

maintain the cell as MAC activated; and start monitoring a search space for receiving an indication to monitor the physical downlink control channel.

13. The wireless device of claim 12, wherein the instructions, when executed by the one or more processors, further cause the wireless device, when the first MAC cell deactivation timer expires or the wireless device receives a MAC deactivation command for the cell, to:

stop the second deactivation timer;

stop the first MAC cell deactivation timer;

MAC deactivate the cell; and stop monitoring the physical downlink control channel.

14. A method performed by a wireless device, the method comprising:

receiving one or more radio resource control (RRC) messages configuring:

a first medium access control (MAC) cell deactivation timer for MAC activating a cell; and a second deactivation timer associated with monitoring a physical downlink control channel for the cell;

receiving a MAC control element (CE) indicating MAC activating the cell;

in response to receiving the MAC CE, MAC activating the cell and starting the MAC cell deactivation timer;

receiving a first downlink control information (DCI) comprising a field indicating activation to monitor the physical downlink control channel;

based on receiving the first DCI:

starting monitoring the physical downlink control channel;

starting the MAC cell deactivation timer; and starting the second deactivation timer;

receiving a second DCI comprising a field indicating not monitoring the physical downlink control channel; and based on the second DCI, stopping monitoring the physical downlink control channel, wherein the cell is maintained as MAC activated.

15. The method of claim 14, further comprising, when the first MAC cell deactivation timer expires or the wireless device receives a MAC deactivation command for the cell:

stopping the second deactivation timer;

stopping the first MAC cell deactivation timer;

MAC deactivating the cell; and stopping monitoring the physical downlink control channel.

16. The method of claim 15, further comprising, when the second deactivation timer expires:

stopping monitoring the physical downlink control channel;

maintaining the cell as MAC activated; and starting monitoring a search space for receiving an indication to monitor the physical downlink control channel.

17. The method of claim 16, further comprising monitoring the physical downlink control channel when the first MAC cell deactivation timer and the second deactivation timer are running.

18. The method of claim 16, further comprising starting monitoring a second physical downlink control channel based on the second DCI.

19. The method of claim 16, further comprising:

receiving a third DCI indicating an uplink grant or downlink assignment for the cell; and based on the third DCI:

starting the first MAC cell deactivation timer;

starting the second deactivation timer; and starting monitoring the physical downlink control channel.

20. The method of claim 14, wherein the second deactivation timer is associated with PHY activation and PHY deactivation, and wherein:

the PHY activation comprises monitoring the physical downlink control channel; and the PHY deactivation comprises not monitoring the physical downlink control channel.

21. The method of claim 20, further comprising:

receiving a third DCI indicating an uplink grant or downlink assignment for the cell; and based on the third DCI:

starting the first MAC cell deactivation timer;

starting the second deactivation timer; and starting monitoring the physical downlink control channel.

22. The method of claim 21, further comprising, based on the second DCI, switching to monitor another physical downlink control channel.

23. The method of claim 22, further comprising stopping monitoring the physical downlink control channel, based on the second deactivation timer expiring.

24. The method of claim 23, further comprising stopping the second deactivation timer in response to receiving the second DCI.

25. The method of claim 20, further comprising, when the second deactivation timer expires:

stopping monitoring the physical downlink control channel;

maintaining the cell as MAC activated; and starting monitoring a search space for receiving an indication to monitor the physical downlink control channel.

26. The method of claim 25, further comprising, when the first MAC cell deactivation timer expires or the wireless device receives a MAC deactivation command for the cell:

stopping the second deactivation timer;

stopping the first MAC cell deactivation timer;

MAC deactivating the cell; and stopping monitoring the physical downlink control channel.

* * * * *